US012674980B2

(12) United States Patent
Harada et al.

(10) Patent No.: US 12,674,980 B2
(45) Date of Patent: Jul. 7, 2026

(54) HEAD-UP DISPLAY DEVICE

(71) Applicant: Magnolia White Corporation, Tokyo (JP)

(72) Inventors: Tsutomu Harada, Tokyo (JP); Daisuke Ozeki, Tokyo (JP); Junji Kobashi, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 571 days.

(21) Appl. No.: 18/127,274

(22) Filed: Mar. 28, 2023

(65) Prior Publication Data

US 2023/0236416 A1 Jul. 27, 2023

Related U.S. Application Data

(63) Continuation of application No. PCT/JP2021/032471, filed on Sep. 3, 2021.

(30) Foreign Application Priority Data

Oct. 2, 2020 (JP) ................................. 2020-167738

(51) Int. Cl.
*G02B 27/01* (2006.01)
*B60K 35/10* (2024.01)
(Continued)

(52) U.S. Cl.
CPC .............. *G02B 27/01* (2013.01); *B60K 35/10* (2024.01); *B60K 35/211* (2024.01); *B60K 35/22* (2024.01);
(Continued)

(58) Field of Classification Search
CPC .... G02B 27/0101; G02B 30/31; G02B 30/30; G02B 30/32; G02B 27/01; G02B 2027/0129; G02B 26/0816; G02B 27/0172; G02B 27/0093; G02B 2027/0183; G02B 2027/0123
See application file for complete search history.

(56) References Cited

U.S. PATENT DOCUMENTS

2013/0188259 A1 7/2013 Nakamura et al.
2022/0003997 A1 1/2022 Kusafuka et al.

FOREIGN PATENT DOCUMENTS

JP 2012-058689 A 3/2012
JP 2019-083385 A 5/2019
(Continued)

OTHER PUBLICATIONS

Office Action issued in related Japanese Patent Application No. 2020-167738, mailed on Dec. 12, 2023 and English translation of same. 5 pages.

(Continued)

*Primary Examiner* — Brandi N Thomas
(74) *Attorney, Agent, or Firm* — K&L Gates LLP

(57) ABSTRACT

According to an aspect, a head-up display device, includes: a display panel configured to display a third image that is a composite of first and second images; a parallax generator configured to generate parallax of the first image and parallax of the second image; and a projection destination part onto which projection light emitted from a display surface side of the display panel and modulated by the parallax generator is projected.

17 Claims, 24 Drawing Sheets

(51) Int. Cl.
    *B60K 35/21*       (2024.01)
    *B60K 35/22*       (2024.01)
    *B60K 35/23*       (2024.01)
    *B60K 35/60*       (2024.01)

(52) U.S. Cl.
    CPC .............. *B60K 35/23* (2024.01); *B60K 35/60*
          (2024.01); *G02B 2027/014* (2013.01); *G02B*
                        *2027/0161* (2013.01)

(56)               References Cited

FOREIGN PATENT DOCUMENTS

| | | | |
|---|---|---|---|
| JP | 2020-019420 A | 2/2020 | |
| JP | 2020-077907 A | 5/2020 | |
| WO | WO-2020095731 A1 * | 5/2020 | ........... B60K 35/231 |

OTHER PUBLICATIONS

International Search Report issued in related International Patent
Application No. PCT/JP2021/032471 on Nov. 22, 2021 and English
translation of same. 5 pages.
Written Opinion issued in related International Patent Application
No. PCT/JP2021/032471 on Nov. 22, 2021. 3 pages.

* cited by examiner

FIG.1

HEAD-UP DISPLAY DEVICE

CROSS-REFERENCE TO RELATED APPLICATION

This application claims the benefit of priority from Japanese Patent Application No. 2020-167738 filed on Oct. 2, 2020 and International Patent Application No. PCT/JP2021/032471 filed on Sep. 3, 2021, the entire contents of which are incorporated herein by reference.

BACKGROUND

1. Technical Field

What is disclosed herein relates to a head-up display device.

2. Description of the Related Art

Head-up display (HUD) devices have been known that project images onto members located in user's field of view and having a light-transmitting property (for example, Japanese Patent Application Laid-open Publication No. 2012-058689).

In provision of information to users through images projected by the head-up display devices, there is a request to express more detailed information through a three-dimensional (3D) spatial overlapping of a plurality of images. Conventional head-up display devices are unable to reproduce such a 3D spatial overlapping of a plurality of images.

For the foregoing reasons, there is a need for a head-up display device that can reproduce a 3D spatial overlapping of a plurality of images.

SUMMARY

According to an aspect, a head-up display device, includes: a display panel configured to display a third image that is a composite of first and second images; a parallax generator configured to generate parallax of the first image and parallax of the second image; and a projection destination part onto which projection light emitted from a display surface side of the display panel and modulated by the parallax generator is projected.

BRIEF DESCRIPTION OF THE DRAWINGS

FIG. 1 is a schematic diagram illustrating a main configuration of a display device in a first embodiment;

DETAILED DESCRIPTION

Figure 2:
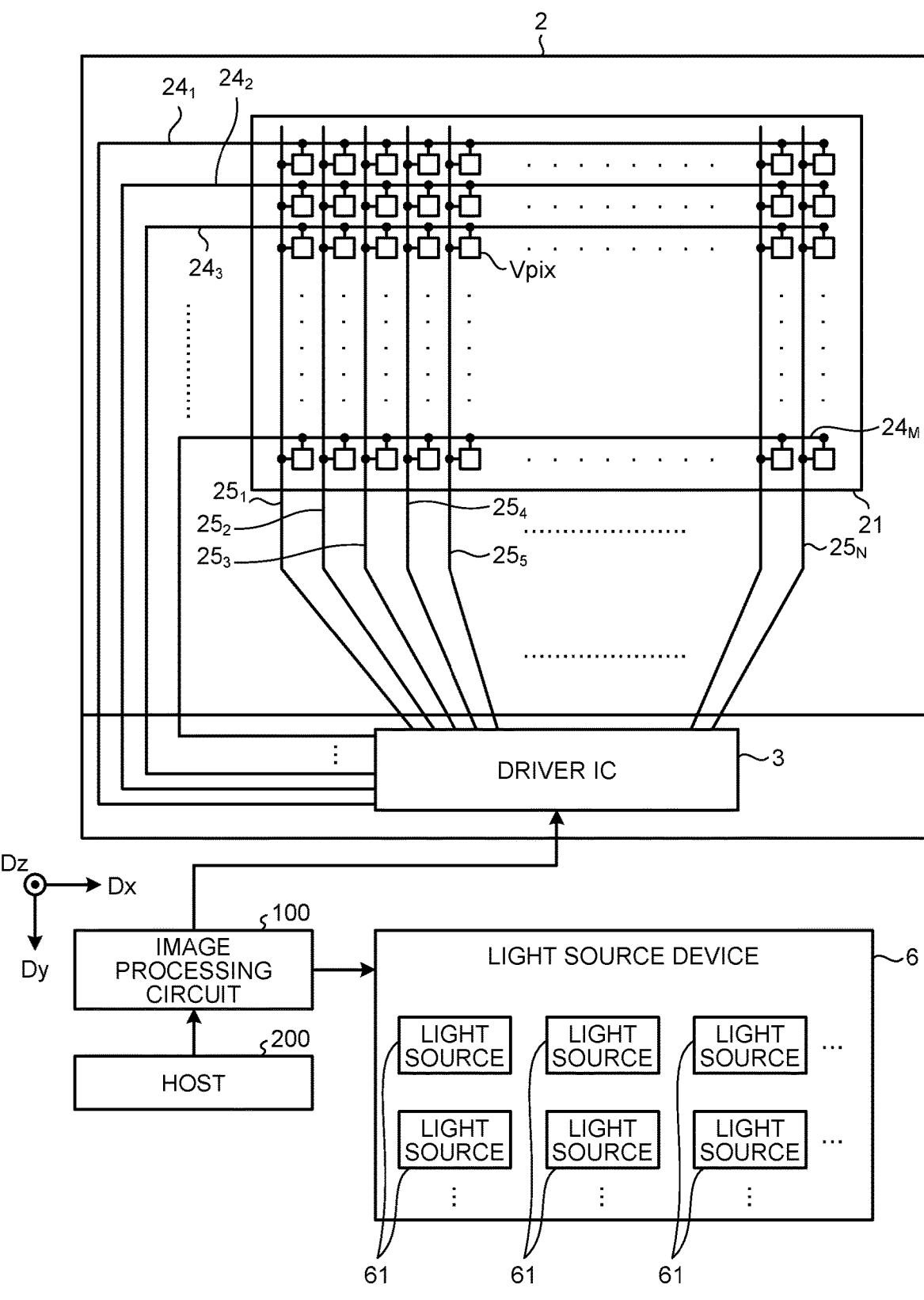
FIG. 2 is a block diagram illustrating an exemplary system configuration of a display panel.

Hereinafter, embodiments of the invention will be described with reference to the drawings. What is disclosed herein is merely an example, and it is needless to say that appropriate modifications within the gist of the invention at which those skilled in the art can easily arrive are encompassed in the scope of the invention. In the drawings, widths, thicknesses, shapes, and the like of the components can be schematically illustrated in comparison with actual modes for clearer explanation. They are, however, merely examples and do not limit interpretation of the invention. In the present specification and the drawings, the same reference numerals denote components similar to those described before with reference to the drawing that has already been referred to, and detail explanation thereof can be appropriately omitted.

First Embodiment

Figure 1:
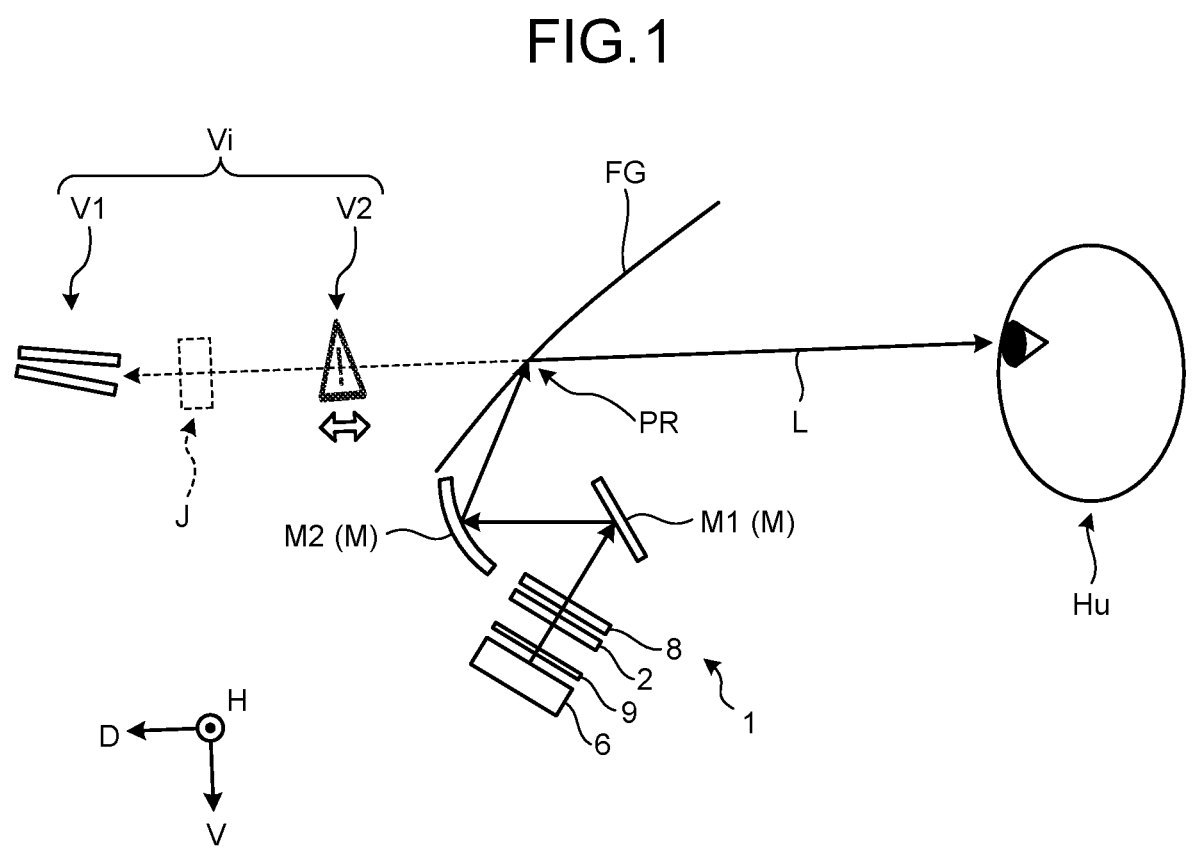

FIG. 1 is a schematic diagram illustrating a main configuration of a display device 1 in a first embodiment. The display device 1 includes a light source device 6, a display panel 2 that outputs an image using light L from the light source device 6, and a diffusion plate 9 provided between the display panel 2 and the light source device 6, for example. Light L emitted from the light source device 6 is diffused by the diffusion plate 9, passes through the display panel 2 and a parallax generator 8, and is partially reflected by a mirror M and a front windshield FG to reach a user Hu, whereby the light L is perceived as an image object Vi in the user Hu's field of view. In other words, the display device 1 in the present embodiment functions as a HUD device using the mirror M and the front windshield FG.

In the following description, the depth direction is denoted as D, the vertical direction orthogonal to the depth direction D is denoted as V, and the horizontal direction orthogonal to the depth direction D and the vertical direction V is denoted as H in the 3-dimensional (3D) space of the image perceived by the user Hu. The vertical direction V coincides with the direction along the scan direction in image output that is performed line by line. In the present embodiment, the depth direction D that is actually perceived by the user Hu, the vertical direction V parallel to the perpendicular direction, and the horizontal direction H orthogonal to the perpendicular direction are coincident with the depth direction D, the vertical direction V, and the horizontal direction H, respectively, in the 3D space.

More specifically, the image object Vi including image objects V1 and V2 is perceived by the user Hu when the light L corresponding to an output image OA (refer to FIG. 7) is projected onto a projection position PR of the front windshield FG, for example. The image object Vi is perceived as a 3D image. The image object V1 is perceived by the user Hu as being located farther from the user Hu (on the far side) than a reference display position J in the depth direction D. The image object V2 is perceived by the user Hu as being located nearer to the user Hu (on the near side) than the reference display position J in the depth direction D. The front windshield FG is a projection destination part in the embodiment, e.g., the front windshield of a vehicle. The projection destination part is not limited to the front windshield FG, but may be any member that has a light-transmitting property and is located on the visual line of the user Hu. The projection destination part may be a windshield or a plate member having a light-transmitting property, which is called a combiner provided separately from the front windshield, for example.

In FIG. 1, after passing through the display panel 2, the light L passes through two mirrors M, which includes a plate mirror M1 and a concave mirror M2. The number of mirrors M is not limited to two, but may be one, or three or more.

Figure 3:
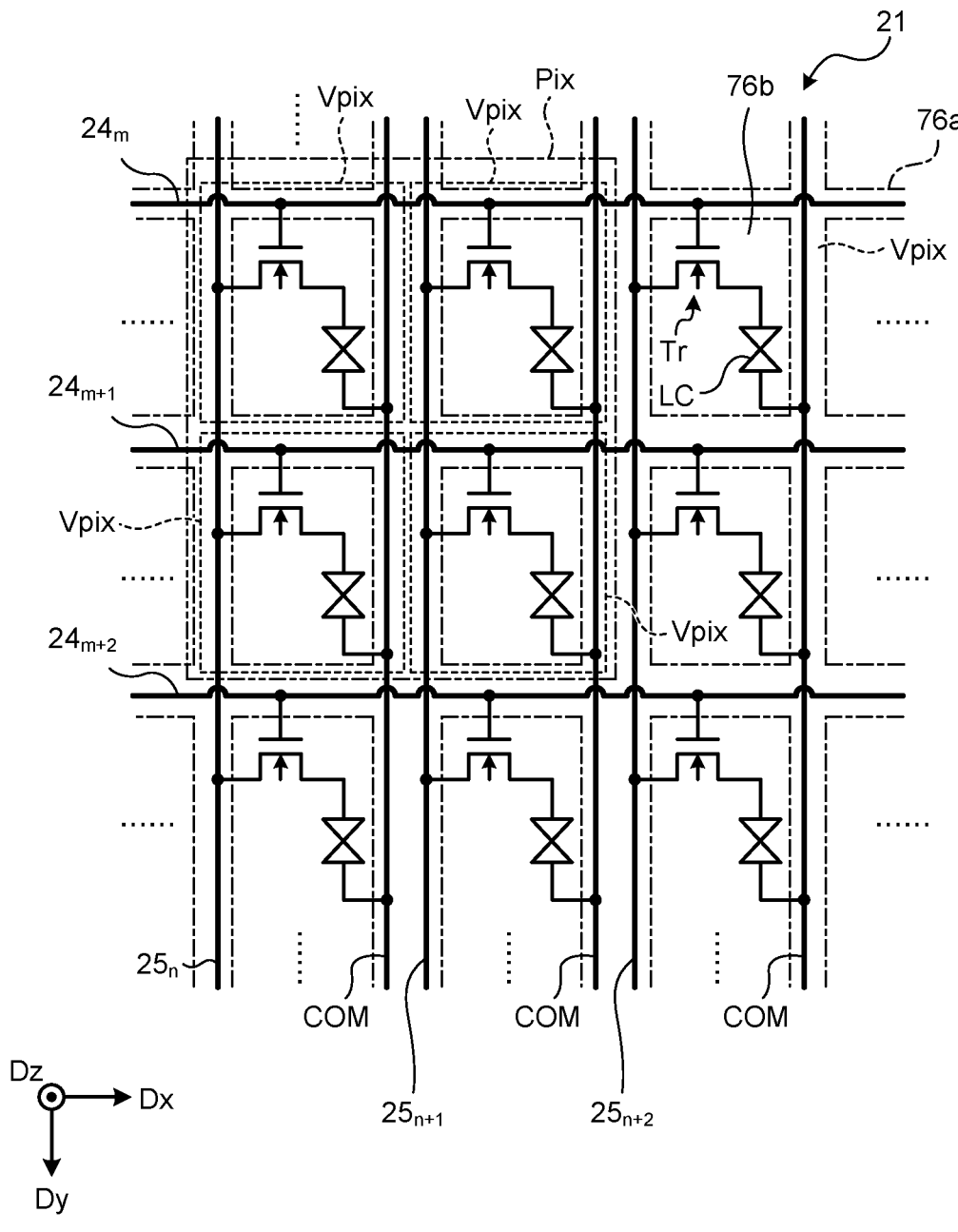
FIG. 3 is a circuit diagram illustrating an exemplary configuration of a drive circuit that drives pixels of the display panel.

The following describes the display panel 2. FIG. 2 is a block diagram illustrating an exemplary system configuration of the display panel 2. FIG. 3 is a circuit diagram illustrating an exemplary configuration of a drive circuit that drives pixels Pix of the display panel 2. The display panel 2 is provided with a driver IC 3. The driver IC 3 is a display driver integrated circuit (DDIC), for example.

More specifically, the display panel 2 is a transmissive liquid crystal panel that outputs an image using the light L, for example. The liquid crystal panel is an insulating substrate having a light-transmitting property such as a glass substrate, for example. The liquid crystal panel has a display region 21, which is on the glass substrate. The display region 21 has a large number of pixels Pix including liquid crystal cells arranged in a matrix with a row-column configuration. The pixel Pix includes a plurality of sub-pixels Vpix (refer to FIG. 3). The liquid crystal panel is composed of a first substrate and a second substrate. A large number of pixel circuits including active elements (e.g., transistors) are formed on the first substrate in an arrangement of a matrix with a row-column configuration. The gap between the first substrate and the second substrate is maintained at a predetermined gap by photo spacers arranged and formed at various locations on the first substrate. A liquid crystal is enclosed between the first and the second substrates. The arrangement of the components and the size of each component illustrated in FIG. 2 are schematic and do not reflect the actual arrangement and the like.

The display region 21 has a matrix structure with a row-column configuration in which the sub-pixels Vpix including the liquid crystal layer are arranged in M rows by N columns. In this specification, the row is referred to as a pixel row that has N sub-pixels Vpix aligned in one direction. The column is referred to as a pixel column that has M sub-pixels Vpix aligned in a direction orthogonal to the direction in which the rows extend. The values of M and N are determined depending on the resolution in the direction Dy, which is a second direction, and the resolution in the direction Dx, which is a first direction. In the display region 21, scan lines $24_1$, $24_2$, $24_3$, . . . , and $24_M$ are provided row by row along the first direction Dx while signal lines $25_1$, $25_2$, $25_3$, . . . , and $25_N$ are provided column by column along the second direction Dy, in the M row-N column array of the sub-pixels Vpix. Hereinafter, in the present embodiment, the scan lines $24_1$, $24_2$, $24_3$, . . . , and $24_M$ may be collectively denoted as the scan lines 24, and the signal lines $25_1$, $25_2$, $25_3$, . . . , and $25_N$ may be collectively denoted as the signal lines 25. In the present embodiment, any three of the scan lines $24_1$, $24_2$, $24_3$, . . . , and $24_M$ are denoted as scan lines $24_m$, $24_{m+1}$, and $24_{m+2}$ (where m is a natural number satisfying m≤M−2), and any three of the signal lines $25_1$, $25_2$, $25_3$, . . . , and $25_N$ are denoted as signal lines $25_n$, $25_{n+1}$, and $25_{n+2}$ (where n is a natural number satisfying n≤N−2).

The first direction Dx and the second direction Dy are directions along the plate surface of the display panel 2 and are orthogonal to each other. The third direction Dz is a direction orthogonal to the first direction Dx and the second direction Dy.

The driver IC 3 is a circuit mounted on the glass substrate of the liquid crystal panel by a chip on glass (COG) method, for example. The driver IC 3 is coupled to an image processing circuit 100 via a flexible printed circuit (FPC), which is not illustrated. The image processing circuit 100 is a circuit that performs operation control on at least the display panel 2. The image processing circuit 100 is coupled to a host 200 via wiring, which is not illustrated. The host 200 is an external information processing device that outputs, to the image processing circuit 100, input images as illustrated in the "input image" row in FIG. 7, which is described later. The image processing circuit 100 outputs pixel signals to individually drive the sub-pixels Vpix included in the pixel Pix, based on an input signal from the host 200. The pixel signal is a combination of gradation values of red (R), green (G), blue (B), and white (W), for example, which is described later. The number and kinds of colors corresponding to the gradation values included in the pixel signal are arbitrary. In the embodiment, the image processing circuit 100 turns on light sources 61 of the light source device 6 when the display device 1 operates. The light source 61 is a light emitting element, such as a light emitting diode (LED). The light source 61 emits light in response to power supply and emits the light L from one surface side (far side) to the other surface side of the display panel 2 in the third direction Dz. When the light sources 61 are provided in the light source device 6 as illustrated in FIG. 2, the light sources 61 are arranged along the plate surface of the display panel 2.

The display panel 2 and the light source device 6 are coupled to an external input power supply or the like, which is not illustrated. The external input power supply supplies the power necessary for the operation of the display panel 2 and the light source device 6.

The driver IC 3 operates the display panel 2 in accordance with various signals supplied from the image processing circuit 100. The image processing circuit 100 outputs a master clock, a horizontal synchronization signal, a vertical synchronization signal, pixel signals, and a drive command signal for the light source device 6 to the driver IC 3, for example. The driver IC 3 functions as a gate driver and a source driver based on those signals. One or both of the gate driver and the source driver may be formed on the substrate using thin film transistors (TFTs), which are described later. In such a case, one or both of the gate driver and the source driver may be electrically coupled to the driver IC 3. The source driver and the gate driver may be electrically coupled to different driver ICs 3 or the same driver IC 3.

The gate driver latches digital data in units of a horizontal period corresponding to the horizontal synchronous signal in synchronization with the vertical and the horizontal synchronous signals. The gate driver sequentially outputs the latched digital data for one line as vertical scan pulses and supplies the digital data to the scan lines 24 (the scan lines $24_1, 24_2, 24_3, \ldots$, and $24_M$) in the display region 21 to select the sub-pixels Vpix sequentially row by row. The gate driver outputs the digital data sequentially to the scan lines $24_1, 24_2, \ldots$ from one end side to the other end of the display region 21 in the row direction, for example. The gate driver can also output the digital data sequentially to the scan lines $24_M, \ldots$ from the other end side to the one end side of the display region 21 in the row direction.

The source driver receives pixel drive data generated based on the pixel signal, for example. The source driver writes the pixel drive data to the sub-pixels Vpix in the row selected by the vertical scan performed by the gate driver via the signal lines 25 (the signal lines $25_1, 25_2, 25_3, \ldots$, and $25_N$), in units of a sub-pixel, in units of a plurality of sub-pixels, or in one unit of all the sub-pixels simultaneously.

Examples of known drive methods for liquid crystal panels include line inversion, dot inversion, and frame inversion. The line inversion is a drive method that reverses the polarity of the video signal in a time period of 1H (H is a horizontal period), which corresponds to one line (one pixel row). The dot inversion is a drive method that alternately reverses the polarity of the video signal for each of sub-pixels adjacent to each other for two intersecting directions (e.g., row and column directions). The frame inversion is a drive method that reverses the video signals to be written to all sub-pixels Vpix at once with the same polarity for each frame corresponding to one screen. The display panel 2 can employ any of the above drive methods.

In the description of the present embodiment, each of M scan lines $24_1, 24_2, 24_3, \ldots$, and $24_M$ may be referred to as the scan line 24 when the M scan lines are collectively handled. The scan lines $24_m, 24_{m+1}$, and $24_{m+2}$ in FIG. 3 are part of the M scan lines $24_1, 24_2, 24_3, \ldots$, and $24_M$. Each of the N signal lines $25_1, 25_2, 25_3, \ldots$, and $25_N$ may be referred to as the signal line 25 when the N signal lines are collectively handled. The signal lines $25_n, 25_{n+1}$, and $25_{n+2}$ in FIG. 3 are part of the N signal lines $25_1, 25_2, 25_3, \ldots$, and $25_N$.

The wiring lines are formed in the display region 21. Examples of the wiring lines include the signal lines 25 that supply the pixel signals to TFT elements Tr in the sub-pixels Vpix and the scan lines 24 that drive the TFT elements Tr. The signal lines 25 extend in a plane parallel to the surface of the glass substrate described above and supply the pixel drive data generated based on the pixel signals for outputting images to the sub-pixels Vpix. The sub-pixels Vpix each include the TFT element Tr and a liquid crystal element LC. The TFT element Tr is formed with a thin-film transistor and is formed with an re-channel metal oxide semiconductor (MOS)-type TFT in this example. One of a source and a drain of the TFT element Tr is coupled to the signal lines 25, a gate of the TFT element Tr is coupled to the scan lines 24, and the other of the source and the drain is coupled to one end of the liquid crystal element LC. The one end of the liquid crystal element LC is coupled to the other of the source and the drain of the TFT element Tr while the other end of the liquid crystal element LC is coupled to a common electrode COM. A drive signal is applied to the common electrode COM by a drive electrode driver, which is not illustrated. The drive electrode driver may be included in the driver IC 3 or an independent circuit.

The sub-pixels Vpix belonging to the same row in the display region 21 are coupled to one another by the scan line 24. The scan lines 24 are coupled to the gate driver and receive the vertical scan pulses of scan signals supplied from the gate driver. The sub-pixels Vpix belonging to the same column in the display region 21 are coupled to one another by the signal line 25. The signal lines 25 are coupled to the source driver and receive the pixel signals supplied from the source driver. Furthermore, the sub-pixels Vpix belonging to the same column in the display region 21 are coupled to one another by the common electrode COM. The common electrodes COM are coupled to the drive electrode driver, which is not illustrated, and receive the drive signals supplied from the drive electrode driver.

The gate driver applies the vertical scan pulses to the gates of the TFT elements Tr of the sub-pixels Vpix via the scan lines 24 to sequentially select, as an image output target, one row (one horizontal line) of the sub-pixels Vpix formed in a matrix with a row-column configuration in the display region 21. The source driver supplies, via the signal lines 25, the pixel signals to the sub-pixels Vpix in the selected one of the horizontal lines that are selected sequentially by the gate driver. As a result, image output for one horizontal line is performed by the sub pixels VPix in accordance with the supplied pixel signals.

As described above, the gate driver sequentially scans the scan lines 24, whereby the horizontal lines of the display panel 2 are sequentially selected one by one. In the display panel 2, the source driver supplies the pixel signals to the sub-pixels Vpix belonging to the selected one horizontal line via the signal lines 25, and the image output is performed for each horizontal line. When this image output operation is performed, the drive electrode driver applies the drive signals to the common electrodes COM under the image output operation.

The display region 21 has a color filter. The color filter has a lattice-shaped black matrix 76a and apertures 76b. The black matrix 76a is formed to cover the peripheries of the sub-pixels Vpix as illustrated in FIG. 3. In other words, the black matrix 76a placed at the boundaries of the two-dimensionally arranged sub-pixels Vpix has a lattice shape. The black matrix 76a is formed of a material having a high light absorptance. The apertures 76b are openings formed in the lattice shape corresponding to the shape of the black matrix 76a and are arranged corresponding to sub-pixels Vpix.

The aperture 76b includes color regions corresponding to three-color (e.g., R (red), G (green), B (blue)) or four-color sub-pixels Vpix. Specifically, the aperture 76b includes color regions colored red (R), green (G), and blue (B), which are examples of first, second, and third colors, and the color region of a fourth color (e.g., white (W)), respectively. In the color filter, color regions colored red (R), green (G), and blue (B) are periodically arranged in the apertures 76b, for example. When the fourth color is white (W), no coloring by the color filter is applied to the white (W) color region in the aperture 76b. If the fourth color is another color, the region is colored with the color employed as the fourth color by the color filter. In the present embodiment, three color (R, G, and B) regions and a fourth color (e.g., W) are associated with the sub-pixels Vpix illustrated in FIG. 3. The set of four-color sub-pixels Vpix is associated with one pixel Pix. The pixel signal for one pixel Pix in the present embodiment corresponds to the output of one pixel Pix having red (R), green (G), blue (B), and the fourth color (white (W)) sub-pixels Vpix. In the explanation of the present embodiment, red (R), green (G), blue (B), and white (W) are sometimes simply described as R, G, B, and W. When the number of colors of the sub-pixels Vpix included in the pixel Pix is equal to or smaller than two, or equal to or larger than five, the digital data corresponding to the number of colors may be supplied based on the original image data.

The color filter may be a combination of other colors as long as they are colored differently. In general, in the color filter, the luminance of the green (G) color region is higher than that of the red (R) and blue (B) color regions. When the fourth color is white (W), the color filter may be colored white using a resin having a light-transmitting property.

In the display region 21, the scan lines 24 and the signal lines 25 are disposed in the region overlapping with the black matrix 76a of the color filter when viewed from a direction orthogonal to the front surface of the display region 21. In other words, the scan lines 24 and the signal lines 25 are hidden behind the black matrix 76a when viewed from the direction orthogonal to the front surface. In the display region 21, the region where the black matrix 76a is not disposed is occupied with the apertures 76b.

Figure 4:
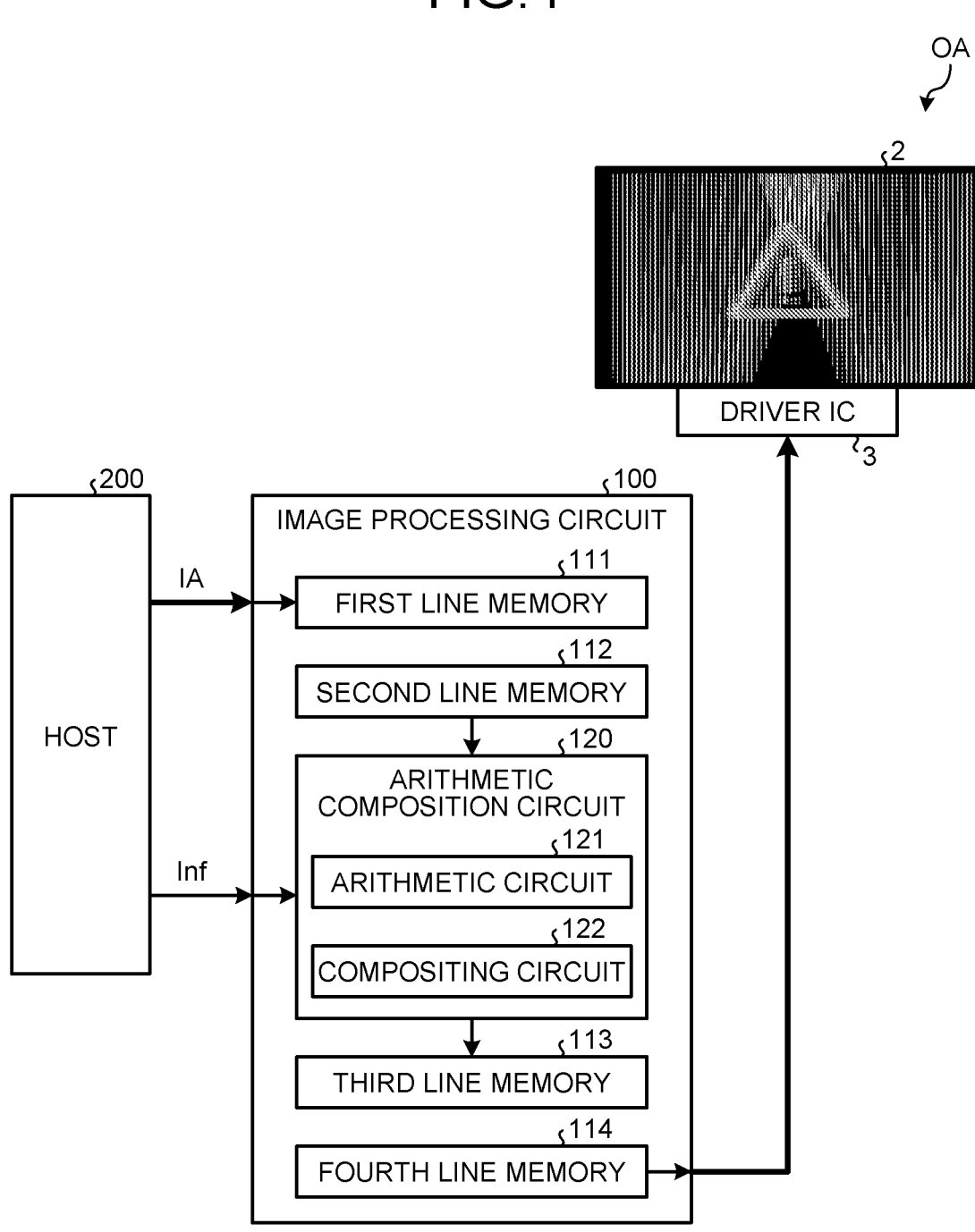
FIG. 4 is a block diagram illustrating an exemplary main configuration related to the input and output of images in the display device.

FIG. 4 is a block diagram illustrating an exemplary main configuration related to the input and output of images in the display device 1. The image processing circuit 100 is an integrated circuit that includes a first line memory 111, a second line memory 112, an arithmetic composition circuit 120, a third line memory 113, and a fourth line memory 114. The arithmetic composition circuit 120 includes an arithmetic circuit 121 and a compositing circuit 122. Specifically, the image processing circuit 100 is an integrated circuit that integrates a plurality of functions into a single circuit, such as an application specific integrated circuit (ASIC) or a field programmable gate array (FPGA), for example. The image processing circuit 100 is not limited to this example, and its specific form can be changed as appropriate as long as it is a circuit that functions in the same way. In the following explanation, when referring to a "line", the "line" denotes a pixel row (one line). The pixel row is composed of a plurality of pixels Pix aligned in the first direction Dx sharing one scan line 24. When referring to "line image data", the "line image data" denotes partial data of frame image data in which a gradation value is set for each of the pixels Pix arranged in a matrix with a row-column configuration, such as an input image that is output from the host 200. The "line image data" is data that is displayed in the pixels aligned in the horizontal direction H. Specifically, the "line image data" is data in which a plurality of dot images are aligned in the horizontal direction H. Thus, the frame image data is data in which a plurality of pieces of line image data are aligned in the vertical direction V.

The first line memory 111, the second line memory 112, the third line memory 113, and the fourth line memory 114 are volatile semiconductor memories each capable of holding the image data for each line (hereinafter referred to as the line image data). The line image data received from the host 200 is first stored in the first line memory 111. The line image data in the first line memory 111 is copied into the second line memory 112. The arithmetic composition circuit 120 reads the line image data from the second line memory 112 and performs processing with the arithmetic circuit 121 and the compositing circuit 122. The line image data processed by the arithmetic composition circuit 120 is stored in the third line memory 113. The line image data stored in the third line memory 113 is copied into the fourth line memory 114 and output from the fourth line memory 114 to the driver IC 3. In FIG. 4, the image processing circuit 100 is illustrated as a circuit independent from the driver IC 3, but the image processing circuit 100 may be integrated into the driver IC 3 and be part of a circuit inside the driver IC 3. When the image processing circuit 100 is integrated into the driver IC 3, the display panel 2 has the line memories.

The driver IC 3 outputs the image received from the fourth line memory 114 for each of the lines aligned in the second direction Dy. In the embodiment, the output of a single line is performed for one line image, but the output of a plurality of lines may be performed for one line image. The output of a frame image is performed by outputting the image for each line from one end side to the other end side of the display panel 2 in the second direction Dy.

Figure 5:
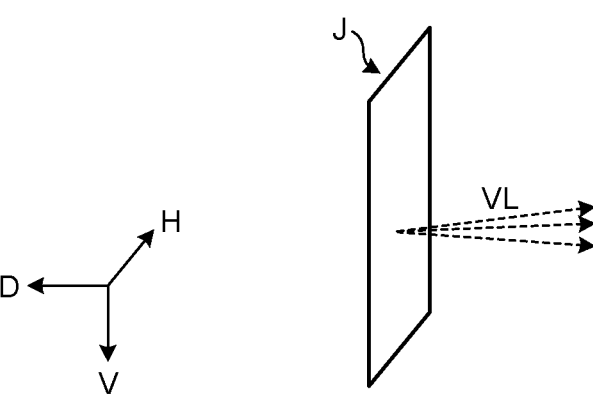
FIG. 5 is a schematic diagram of a light field display.

FIG. 5 is a schematic diagram of a light field display. The display device 1 can arbitrarily control the position in the depth direction D of the image viewed by the user Hu with reference to the reference display position J illustrated in FIG. 1. For example, FIG. 1 illustrates an example in which the image object V1 that is perceived as an image on the far side in the depth direction D by the user Hu and the image object V2 that is perceived as an image on the near side in the depth direction D by the user Hu, are perceived by the user Hu as an overlapped image. This display method in the embodiment, in which the position in the depth direction D of the viewed image can be arbitrarily controlled with reference to the reference display position J may be called a light field display method. This display device in the embodiment that includes at least the display panel 2 and either one of the parallax generator 8 and a parallax generator 8A and makes the light field display method implementable, may be called a light field panel. In the light field display, different images may be viewed by the right eye and left eye to generate parallax such that depth is perceived as a 3D image from any of a plurality of viewpoints.

The light field panel causes the user Hu to view 3D images such as the image object Vi. FIG. 5 schematically illustrates that the light field display allows the user Hu to perceive parallax-generating light VL for generating a parallax image as if the parallax-generating light VL were emitted from the reference display position J. The parallax-generating light VL reaching the user Hu generates parallax between the image perceived through the user Hu's right eye and the image perceived through the user Hu's left eye. The parallax causes the user to perceive a 3D image such as the image object Vi. Such perception by the user Hu is achieved by the combination of the light source device 6, the display panel 2, and the parallax generator 8, for example.

Figure 6:
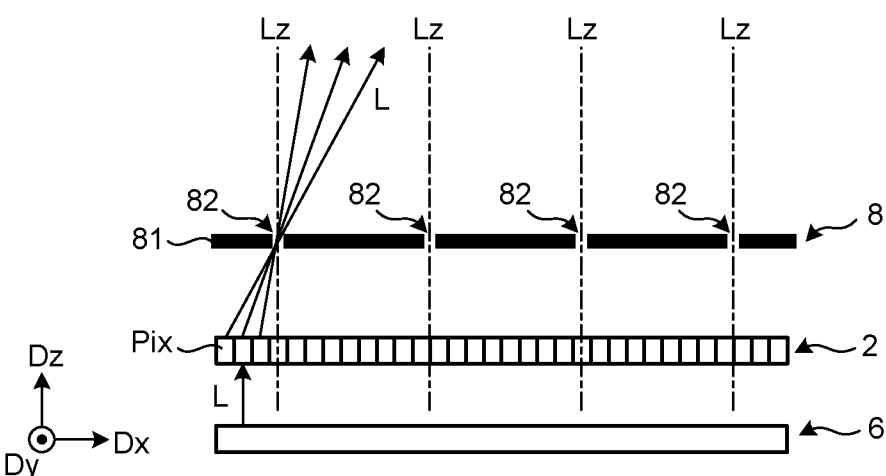
FIG. 6 is a schematic diagram illustrating the first embodiment forming a light field panel.

FIG. 6 is a schematic diagram illustrating the first embodiment, which forms the light field panel. As illustrated in FIG. 6, part of the light L that passes through the pixels Pix of the display panel 2 and travels toward the plate mirror M1 (refer to FIG. 1) is blocked by the parallax generator 8, thereby allowing the pixel Pix that the user Hu views with the right eye and the pixel Pix that the user Hu views with the left eye to be different from each other. The parallax generator 8 has a light shield 81 and a plurality of slits 82. The light shield 81 is a light-blocking plate provided along the first direction Dx-second direction Dy plane, for example. The light shield 81 is provided to cover the light that has such an outgoing angle that the light is transmitted through the display panel 2 and reflected by the plate mirror M1. The slits 82 are provided in the light shield 81, for example. Each slit 82 is a straight slit along the second direction Dy. The length of the slit 82 in the second direction Dy is determined so that the light shield 81 does not block light from all of the pixels Pix aligned in the second direction Dy in the display panel 2. The positions, sizes, and shapes of the slits 82 are determined based on prior measurements and other factors so that the parallax image using the position of the reference display position J as a reference is perceived by the user Hu. In the light field display, different images may be viewed by the right eye and left eye to generate parallax such that depth is perceived as a 3D image from any of the viewpoints.

Figure 7:
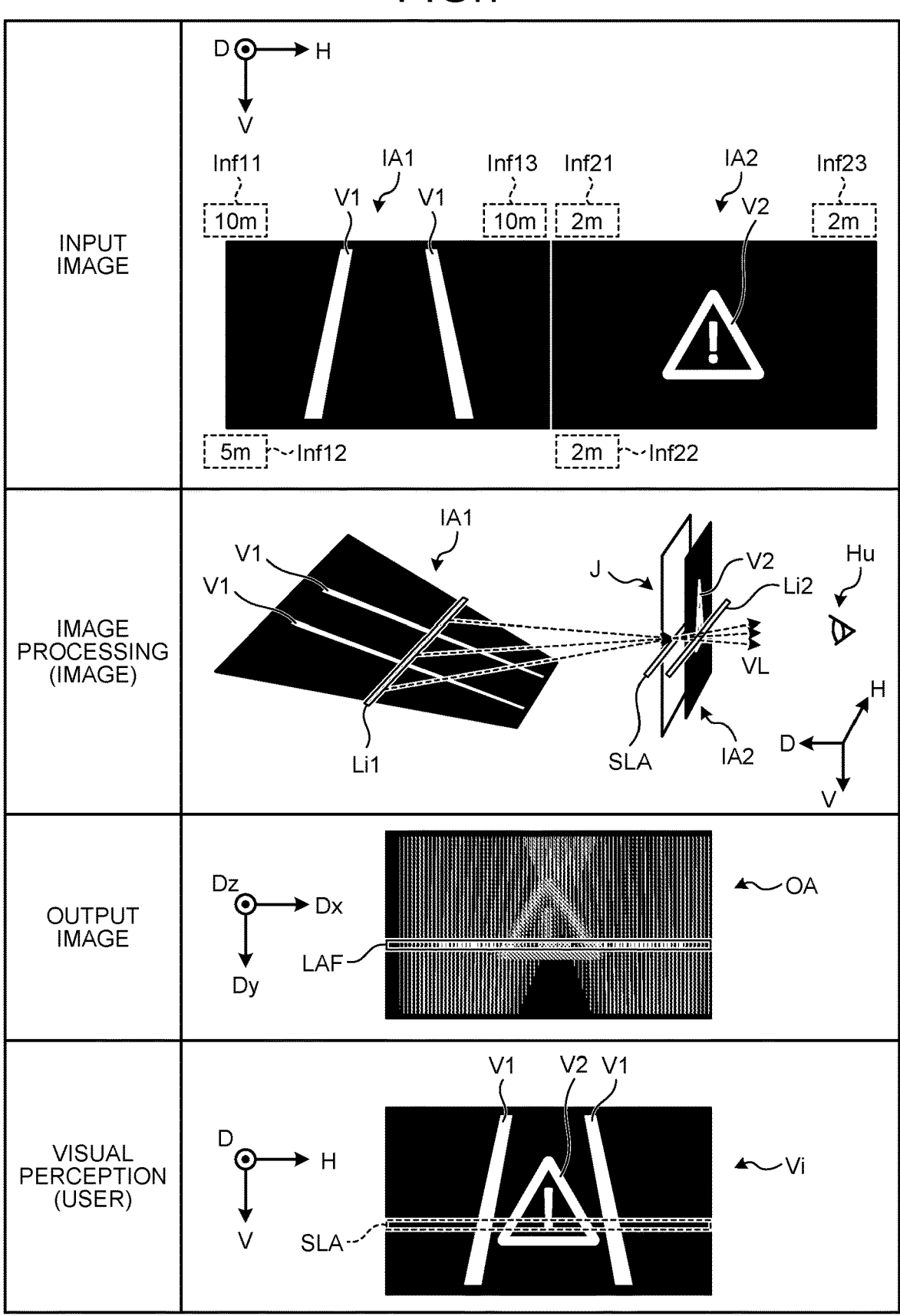
FIG. 7 is a schematic diagram illustrating an exemplary relation between an "input image", "image processing (image)", an "output image (display panel)", and "visual perception (user)" in the embodiment.

FIG. 7 is a schematic diagram illustrating an exemplary relation between an "input image", "image processing (image)", an "output image (display panel)", and "visual perception (user)" in the embodiment. The "input image" is the input image input to the image processing circuit 100. The "image processing (image)" is the image processing performed by the image processing circuit 100. The "output image (display panel)" is the image that is output from the image processing circuit 100 to the display panel 2. The "visual perception (user)" is a 3D image perceived by the user Hu who views the projection position PR where the "output image" is projected.

The display device 1 in the embodiment employs the light field display method. The display device 1 in the embodiment allows the user Hu to view a 3D image in which a plurality of image objects overlap in the depth direction D with reference to the reference display position J, as the image object Vi including the image objects V1 and V2 illustrated in FIG. 1. Hereinafter, when simply referring to the image object, it denotes the image object included in the image object Vi. The image processing circuit 100 of the display device 1 capable of outputting such 3D images receives a plurality of input images corresponding to a plurality of image objects overlapping when viewed in the depth direction D, which are exemplarily illustrated in the "input image" row in FIG. 7. In the embodiment, a "side-by-side" input denotes an input of the input images corresponding to the image objects to be composited such that they are viewed as if they were arranged in the depth direction D and overlapped with each other. In the side-by-side input, a line image of one of the input images is input to the first line memory 111, for example. The line image is copied from the first line memory 111 to the second line memory 112, and the line image of another one of the input images is copied into the first line memory 111. The arithmetic composition circuit 120 reads the line image of the one of the input images from the second line memory 112. The line image of the other input image is copied from the first line memory 111 to the second line memory 112. In a case where there is a third input image, the line image of the third input image is input to the first line memory 111 when the line image of the other input image is copied from the first line memory 111 to the second line memory 112. Thereafter, the processing proceeds in the same manner until the input of all of the line images of all of the input images is completed. When the input of one line image is completed for each of the input images, the input and processing target proceeds to the next line of each of the input images. In the "input image" row of FIG. 7, an input image IA1 and an input image IA2 are exemplarily illustrated. The input image IA1 is an image including the image object V1. The input image IA2 is an image including the image object V2. The input image IA1 is an example of a first image. The input image IA2 is an example of a second image.

The regions filled in black in the input images IA1 and IA2 illustrated in FIG. 7 are the regions where no image objects exist (background). In the embodiment, transparency processing with a transmittance of 100% is performed on the background of the input image.

Positional information Inf is added to each of the input images. For example, as the positional information Inf, positional information Inf11 and positional information Inf12 are added to the input image IA1. The positional information Inf11 indicates that an end on one side in the vertical direction V (i.e., one end) is located at a position of "10 m". The positional information Inf12 indicates that an end on the other side in the vertical direction V (i.e., the other end) is located at a position of "5 m". In addition, as the positional information Inf, positional information Inf13 is added to the input image IA1. The positional information Inf13 indicates that an opposing end is located at "10 m". The opposing end is an end located on the one end side in the vertical direction V and opposed in the horizontal direction H to the one end indicated by the positional information Inf11. As the positional information Inf, positional information Inf21 and positional information Inf22 are added to the input image IA2. The positional information Inf21 indicates that an end on one side in the vertical direction V (i.e., one end) is located at "2 m". The positional information Inf22 indicates that an end on the other side in the vertical direction V (i.e., the other end) is located at "2 m". In addition, as the positional information Inf, positional information Inf23 is added to the input image IA2. The positional information Inf23 indicates that an opposing end is located at "2 m". The opposing end is an end located on the one end side in the vertical direction V and opposed in the horizontal direction H to the one end indicated by the positional information Inf21. The positional information Inf indicates the position in the depth direction D.

The arithmetic composition circuit 120 of the image processing circuit 100 determines the position of each image object in the depth direction D based on the positional information Inf and generates the output image OA. The output image OA is perceived by the user Hu as the image object Vi. Specifically, as illustrated in the "image processing" row in FIG. 7, for example, the arithmetic composition circuit 120 determines the positions of the input images IA1 and IA2 in the depth direction D with reference to the reference display position J and composites the input images IA1 and IA2.

The image processing circuit 100 (refer to FIG. 4) composites the input images IA1 and IA2 in units of line image data. FIG. 7 schematically illustrates an example where a line image Li1 of the input image IA1 and a line image Li2 of the input image IA2 are composited and projected to be viewed as a single projected line image SLA. In actuality, the same process is performed on all of the line images of the input images IA1 and IA2 to generate the output image OA illustrated in the "output image" row in FIG. 7. The output image OA is an example of the third image.

The image processing circuit 100 in the embodiment performs magnification change processing for each of the input images (e.g., the input images IA1 and IA2) according to the positional information Inf. Specifically, the arithmetic circuit 121 enlarges, in the horizontal direction H, the input image with the positional information Inf indicating a position farther than a reference distance L0 (refer to FIG. 8). The reference distance L0 is preliminarily set as the position of the reference display position J in the depth direction D. The arithmetic circuit 121 reduces, in the horizontal direction H, the input image provided with the positional information Inf indicating a position closer than the reference distance L0. Furthermore, the arithmetic circuit 121 sets the positions of the line images included in the input image provided with the positional information Inf indicating that the position on the one end side and the position on the other end side are different in the vertical direction V such that the positions of the line images are different from one another. The input image provided with the positional information Inf indicating a position equal to the reference distance L0 is neither enlarged nor reduced in the horizontal direction H. The position in the depth direction D is the position that the user Hu perceives in the depth direction D when viewing the projection position PR from the predetermined user Hu's position.

In general, 3D images are displayed in perspective, where the image objects farther away in the depth direction D are displayed smaller while the image objects closer in the depth direction D are displayed larger. When such perspective display is simply applied, the image object may unintentionally become too small or too large. In the embodiment, the magnification change processing is performed so that the size of the image object in the input image is maintained regardless of the position indicated by the positional information Inf. This enables the visual perception of the user Hu in which the sizes of the image objects V1 and V2 in the input image are reflected as they are, as illustrated in the relation between the "input image" row and the "visual perception (user)" row in FIG. 7. The image object V1 is composed of two linear image objects. The two rod-shaped image objects are inclined so that the distance therebetween on one end side in the vertical direction V is relatively narrower than that on the other end side in the vertical direction V. The image object V2 is an image object with an exclamation mark inside a triangular frame having rounded vertices. The specific shapes of the image objects V1 and V2 are only examples and are not limited to those examples. The shape, size, color, and other specific features of the image objects are arbitrary.

In the following explanation, the position indicated with the reference distance L0 is in a range greater than 2 m and less than 5 m from the user Hu in the depth direction D.

Specifically, the reference distance L0 is 2.5 m, for example. In other words, the positional information Inf indicating a position farther than the reference distance L0 is added to the input image IA1. The positional information Inf indicating a position closer than the reference distance L0 is added to the input image IA2. The arithmetic circuit 121 enlarges each line image of the input image IA1 in the horizontal direction H and reduces each line image of the input image IA2 in the horizontal direction H, as illustrated in the "image processing" row in FIG. 7. Such projection of the output image OA based on the reference distance L0 can further reduce the occurrence of congestion and focal adjustment inconsistencies in the 3D space of the image object Vi perceived by viewing the output image OA, which is suitable for utilizing the light field display.

The degree of enlargement in the enlargement processing depends on the relation between the position indicated by the positional information Inf and the reference distance L0. Specifically, the arithmetic circuit 121 enlarges the more distant portion of the input image (e.g., the input image IA1) to which the enlargement processing is applied, more prominently. In a case of the input image IA1 illustrated in FIG. 7, as the positional information Inf, the positional information Inf11 indicating that the one end in the vertical direction V is at "10 m" and the positional information Inf12 indicating that the other end in the vertical direction V is at "5 m" are added. When such an input image IA1 is input to the image processing circuit 100, the arithmetic circuit 121 makes the degree of enlargement of the one end side of the input image IA1 more prominent than the other end side, as schematically illustrated in the "image processing" in FIG. 7. As a result of the difference in the degree of enlargement between the one end side and the other end side, the input image IA1, which is shaped in a rectangular image in the "input image" row, is shaped in a trapezoidal image in which the one end is longer than the other end in the horizontal direction H in the "image processing (image)" row.

The reduction degree of the reduction processing also depends on the relation between the position indicated by the positional information Inf and the reference distance L0. Specifically, the arithmetic circuit 121 more prominently reduces the closer portion of the input image to which the reduction processing is applied. More specifically, for example, when the image processing circuit 100 receives an input image to which the reduction processing is applied and in which the one end is closer than the other end, the arithmetic circuit 121 makes the reduction degree of the one end side of the input image more prominent than that of the other end side.

In an input image in which the position on the one end side and the position on the other end side are different in the vertical direction V such as the input image IA1, the positions of the line images in the vertical direction V differ from one another. When the image processing circuit 100 receives such an input image in which the position on the one end side and the position on the other end side are different, the arithmetic circuit 121 calculates the position of each line image of the input image. Specifically, the arithmetic circuit 121 calculates the position of each line image in the input image based on the position on the one end side, the position on the other end side, and the number of line images in the vertical direction V of the input image. For example, when, as the positional information Inf, the positional information Inf11 indicating the position on one end side in the vertical direction V, and the positional information Inf12 indicating the position on the other end side in the vertical direction V are added to an input image as illustrated in the input image IA1, a line image at the middle position in the vertical direction V is located at a position between the position indicated by the positional information Inf11 and the position indicated by the positional information Inf12 (e.g., 7.5 m).

When the position on the one end side in the depth direction D in the vertical direction V is equal to the position on the other end side in the depth direction D in the vertical direction V in an input image such as the input image IA2 to which the positional information Inf21 and the positional information Inf22 are added, interpolation processing of the position of each line image based on the relation between the position on the one end side and the position on the other end side in the vertical direction V is omitted, and all of the line images of the input image are viewed by the user Hu such that they are located at the same position in the depth direction D. This perception of the position in the depth direction D is caused by the parallax between the image viewed by the user Hu's right eye and the image viewed by the user Hu's left eye.

When the positional information Inf added to the input image includes both positions farther and closer than the reference distance L0, the arithmetic circuit 121 generates an image including a part perceived as being at a position farther than the reference display position J and the other part perceived as being at a position closer than the reference display position J. In other words, the arithmetic circuit 121 enlarges, in the horizontal direction H, the partial image perceived as being at the farther position in the input image, and reduces, in the horizontal direction H, the other partial image perceived as being at the closer position in the input image.

Figure 8:
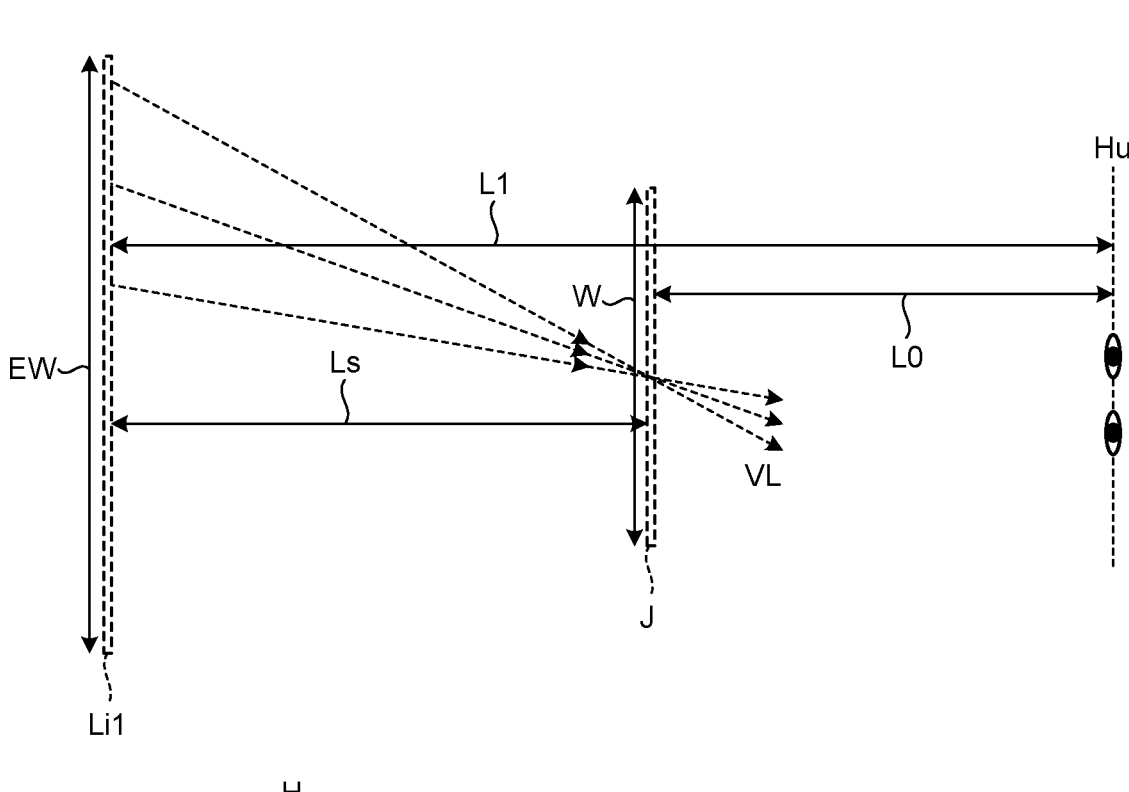
FIG. 8 is a schematic diagram illustrating a method of determining a magnification factor of a line image in enlargement processing.

The following describes the enlargement processing in more detail. FIG. 8 is a schematic diagram illustrating a method of determining the magnification factor of the line image in the enlargement processing. The reference distance L0 in FIG. 8 indicates the position of the reference display position J in the depth direction D. The distance L1 in FIG. 8 indicates the position in the depth direction D of the image object V1 of the line image to which the enlargement processing is applied. For example, the distance L1 of the line image located at the one end of the input image IA1 is 10 m. The distance L1 of the line image located at the other end of the input image IA1 is 5 m. Assuming that Ls is the distance in the depth direction D between the reference display position J and the image object V1, Ls=L1−L0. The width in the horizontal direction H of the line image at the distance L1, which is the distance between the line image and the user Hu, after the enlargement processing can be expressed as EW (=E×W). That is, the width can be expressed by the multiplication of the width W in the horizontal direction H of the reference display position J and a magnification factor E. The magnification factor E is the value obtained by dividing the distance L1 by the reference distance L0. In other words, E=L1/L0.

The arithmetic circuit 121 enlarges each line image included in the input image (e.g., the input image IA1) to which the enlargement processing is applied. The arithmetic circuit 121 performs coordinate transformation processing to identify the relation between the gradation values of dot images aligned in the horizontal direction H in the line image Li1 subjected to the enlargement processing and the gradation values given to the pixels Pix aligned in the first direction Dx in the line of the display panel 2, which provides output corresponding to the line image Li1. The arithmetic circuit 121 performs the coordinate transformation processing to generate pre-composition line images (e.g., pre-composition line images LBF1 and LBF2 illustrated in FIG. 13, which are described later). The compositing circuit 122 composites the pre-composition line images generated by the arithmetic circuit 121 to generate a post-composition line image (e.g., the post-composition line image LAF illustrated in FIG. 13).

Figure 9:
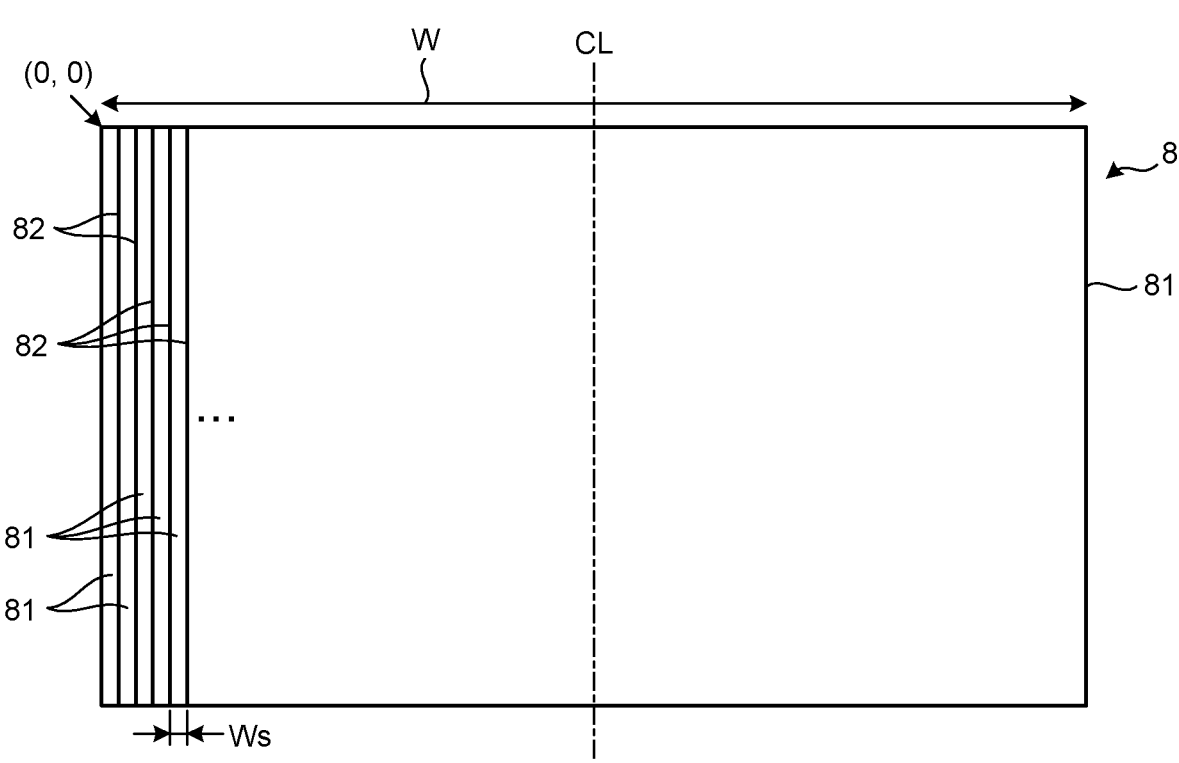
FIG. 9 is a schematic diagram illustrating a relation between a width of a reference display position and an interval between adjacent slits in a first direction.
Figure 9:
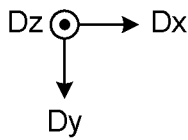

The following describes the concept of the positions of the slits 82 in the coordinate transformation processing with reference to FIG. 9. FIG. 9 is a schematic diagram illustrating a relation between the width W of the reference display position J and an interval Ws between the adjacent slits 82 in the first direction Dx. In FIG. 9, the center line CL of the width W in the horizontal direction H is illustrated with a dash-dot-dash line. The width W in the horizontal direction H of the reference display position J is the same as the width in the first direction Dx of the display panel 2. In other words, the width of the display panel 2 in the first direction Dx is W.

In the embodiment, the slits 82 are provided at intervals Ws from one end to the other end of the parallax generator 8 in the first direction Dx. The one end of the parallax generator 8 can be regarded as the slit 82 where only the other end side, not both sides, is blocked by the light shield 81 in the first direction Dx. Assuming that the slit 82 located at the one end is the 0th slit 82, the first slit 82 is provided at the position with the interval Ws from the one end toward the other end. The second slit 82 is provided at the position with the interval Ws from the first slit 82 toward the other end. Thus, the n-th slit 82 is provided at the position with the interval Ws from the (n−1)th slit 82 toward the other end. n is a natural number equal to or larger than two. The interval Ws is the interval between the slits 82 expressed with reference to the interval between adjacent pixels Pix in the first direction Dx in the display panel 2. In other words, when the interval between the pixels Pix is represented as 1, the interval between the slits 82 is Ws times the interval between the adjacent pixels Pix in the first direction Dx in the display unit 2 (i.e., the ratio thereof is 1:Ws). That is, the width of each of the display panel 2 and the parallax generator 8 in the first direction Dx corresponds to the number of pixels Pix aligned in the first direction Dx in the display panel 2. The position of the center line CL can be expressed as W/2.

The parallax generator 8 is provided to cover the display panel 2 in the first direction Dx. To determine the slit 82 (the nearest slit 82) closest to the x-th pixel Pix counted from the one end side in the pixels Pix aligned in the first direction Dx in the display panel 2, first a reference value t is obtained by equation (1). In equation (1), int( ) is an operator indicating that the decimal fractional part of the number in parentheses is discarded.

$$t = \mathrm{int}(x + Ws/2) \tag{1}$$

Next, a value T is calculated by dividing the reference value t by the interval Ws and rounding the resulting value off, as expressed by equation (2). In equation (2), round( ) is an operator indicating that the decimal fraction part of the number in parentheses is rounded off to an integer value. The value T obtained by equation (2) indicates the nearest slit 82 to the pixel Pix, which is the x-th pixel counting from the one end side. In other words, the T-th slit 82 counted from the one end side is the nearest slit 82.

$$T = \text{round}(t/Ws) \qquad (2)$$

Figure 10:
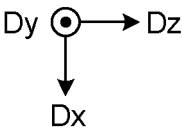
FIG. 10 is a schematic diagram illustrating a relation between the line image subjected to the enlargement processing and gradation values of pixels aligned in the first direction in the display panel.

FIG. 10 is a schematic diagram illustrating the relation between the line image Li1 subjected to the enlargement processing and the gradation values of the pixels Pix aligned in the first direction Dx in the display panel 2. The optical axis Lz, which is the optical axis of light passing the T-th slit 82 in the third direction Dz, is used as a reference. The distance in the first direction Dx between the intersection of the optical axis Lz and the display panel 2 and the position of the x-th pixel Pix is defined as ΔSk. The light that is emitted from the pixel Pix and passes through the T-th slit 82 can be considered to be the light emitted from a dot image Lkx in the line image Li1 subjected to the enlargement processing. The dot image Lkx can be considered to be located at a distance of ΔLk from the intersection of the optical axis Lz and the line image Li1 subjected to the enlargement processing. ΔLk can be expressed by the following equation (3). In equation (3), d is the distance in the third direction Dz between the display panel 2 and the parallax generator 8. Specifically, d is defined as the distance between the panel and the slit, for example. d may be an absolute value of distance based on the metric system, for example, or may be a relative value expressed based on a relative relation obtained by multiplying another distance by a factor.

$$\Delta Lk = \Delta Sk \times (Ls/d) \qquad (3)$$

ΔSk is the distance corresponding to the deviation in the first direction Dx between the pixel Pix, which is determined to be a target pixel, and the optical axis Lz of the nearest slit 82 to the target pixel. The target pixel is the pixel Pix that is the object to which the processing of determining the gradation value in the coordinate transformation processing is applied. It is assumed that the x-th pixel Pix is the target pixel. ΔSk is calculated as the absolute value of the difference between the position (Ws×T) in the first direction Dx of the T-th slit 82 and the position (x) in the first direction Dx of the x-th pixel Pix. ΔSk can be expressed by the following equation (4).

$$\Delta Sk = |(Ws \times T) - x| \qquad (4)$$

Figure 11:
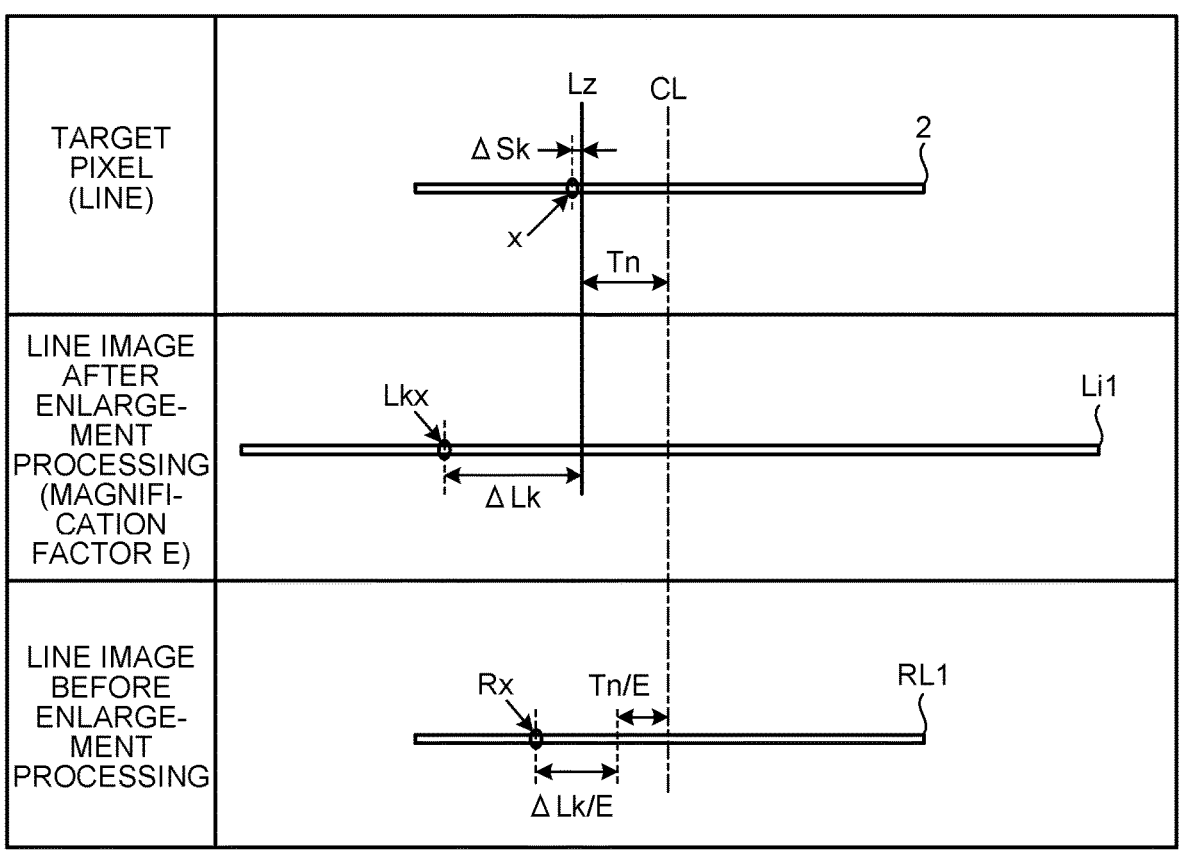
FIG. 11 is a schematic diagram illustrating a concept of coordinate transformation processing in the embodiment.

FIG. 11 is a schematic diagram illustrating the concept of the coordinate transformation processing in the embodiment. The arithmetic circuit 121 first determines a target pixel. The x-th pixel Pix is assumed to be the target pixel. The arithmetic circuit 121 identifies the T-th slit 82 as the nearest slit 82 to the x-th pixel Pix. The arithmetic circuit 121 obtains ΔSk using equation (4). The arithmetic circuit 121 also obtains ΔLk using equation (3).

The arithmetic circuit 121 calculates a distance Tn between the center line CL and the T-th slit 82 using the following equation (5). The position in the first direction Dx of the x-th pixel Pix can be represented as the position separated from the center line CL by the distance obtained by adding the distance Tn and the distance ΔSk in the display panel 2. The position of the dot image that is included in the line image Li1 subjected to the enlargement processing and corresponds to the x-th pixel Pix can be expressed as the position that is located from the center line CL with the distance obtained by adding the distance Tn and the distance ΔLk in the line image. This establishes a relation between the dot image Lkx and the light L that passes through the x-th pixel Pix and the T-th slit 82 and is viewed by the user Hu. In other words, the gradation value of the dot image Lkx, which is located at the position away from the center line CL by a distance of (Tn+ΔLk) in the line image Li1 subjected to the enlargement process, is given to the x-th pixel Pix, thereby reproducing the state in which the dot image Lkx is viewed by the user Hu through the T-th slit 82. In equations (4) and (5), the right-hand side is the absolute value. This is intended only to indicate that the distance is a positive value, and is not necessarily employed in the calculation. In some cases, the absolute value is not employed in the calculation. For example, the distance from one side to the other side may be expressed as a positive distance and the distance from the other side to the one side may be expressed as a negative distance.

$$Tn = |(W/2) - (Ws \times T)| \qquad (5)$$

The line image Li1 is obtained by performing the enlargement processing on the line image included in the input image IA1 by the magnification factor E. The position of the dot image Lkx located at a distance of (Tn+ΔLk) from the center line CL in the line image Li1 corresponds to the position of a dot image Rx located at a distance of (Tn+ΔLk)/E in the line image RL before the enlargement processing is applied. In other words, the line image RL is output from the host 200 and input to the image processing circuit 100 as the input image IA1, and the arithmetic circuit 121 performs the enlargement processing on the line image RL by the magnification factor E, whereby the line image Li1 is generated. The distance between center line CL and (Tn+ΔLk) is applied to the line image Li1, whereby the dot image Lkx is identified. The gradation value of the dot image Lkx is the gradation value of the dot image Rx in the line image RL before the enlargement processing is applied. Thus, it is possible, by giving the gradation value of the dot image Rx to the x-th pixel Pix, to reproduce the state in which the dot image Lkx is viewed by the user Hu through the T-th slit 82.

The arithmetic circuit 121 identifies the dot image Rx located at a distance obtained by dividing the sum of Tn and ΔLk by E, from the center line CL in the line image RL1 before the enlargement processing. In other words, the arithmetic circuit 121 calculates Tn/E+ΔLk/E, i.e., (Tn+ΔLk)/E to identify the dot image Rx located at a distance of (Tn+ΔLk)/E from the center line CL in the line image RL1. The gradation value of the dot image Rx is the gradation value of the dot image Lkx in the line image after the enlargement processing. The arithmetic circuit 121 acquires the gradation value of the dot image Rx as the gradation value of the x-th pixel Pix, i.e., the target pixel. In a case where a target pixel is on one end side of the user Hu with respect to the center line CL, the arithmetic circuit 121 identifies the dot image Rx located at a distance of (Tn+ΔLk)/E from the center line CL toward the one end side in the line image RL1. In a case where a target pixel is on the other end side of the user Hu with respect to the center line CL, the arithmetic circuit 121 identifies the dot image Rx located at a distance of (Tn+ΔLk)/E from the center line CL toward the other end side in the line image RL1.

The case where the x-th pixel Pix is the target pixel is explained above. The arithmetic circuit 121 acquires the gradation values from the input image IA1 for all of the pixels Pix aligned in the horizontal direction H in the display panel 2, by following the procedure for acquiring the gradation value of the target pixel described with reference to FIGS. 8 to 11. That is, the arithmetic circuit 121 first determines a target pixel. The arithmetic circuit 121 identifies the nearest slit 82 to the target pixel based on the predetermined locations of the slits and equations (1) and (2). The arithmetic circuit 121 derives the distance Tn and ΔSk that correspond to the identified slit 82. The arithmetic circuit 121 calculates the distance Ls according to the positional information Inf and the predetermined distance (d), the magnification factor E, and ΔLk. The arithmetic circuit 121 calculates (Tn+ΔLk)/E. As illustrated in the "line image before enlargement processing" row in FIG. 11, the arithmetic circuit 121 applies a distance of a (Tn+ΔLk)/E from the center line CL to the line image RL1 that includes the target pixel in the input image IA1, thereby acquiring the gradation value of the target pixel.

The method of acquiring the gradation value of the target pixel from the input image that is subjected to the enlargement processing among the magnification change processing is described above using the input image IA1 as an example. The same method can be applied to a case where the gradation value of the target pixel is acquired from the input image IA2 that is subjected to the reduction processing among the magnification change processing, with some exceptions. The following describes a difference between the reduction processing and the enlargement processing with reference to FIG. 12.

Figure 12:
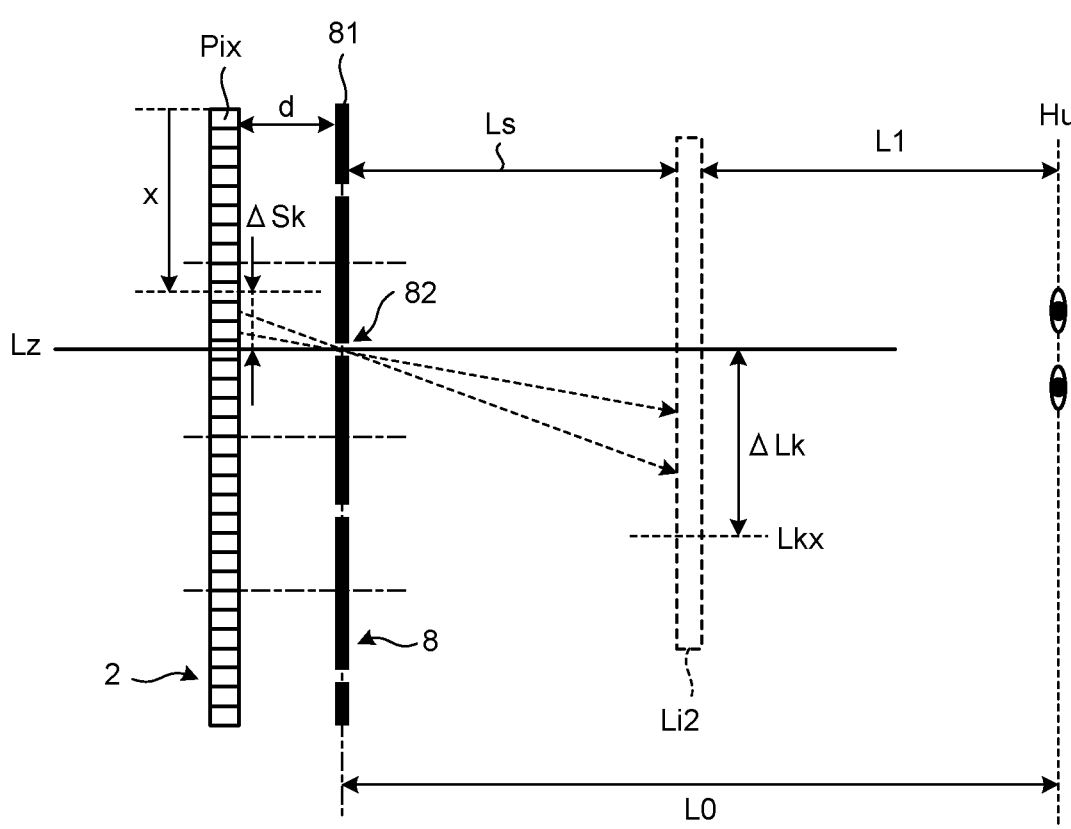
FIG. 12 is a schematic diagram illustrating a mechanism for identifying a dot image in the line image of an input image.
Figure 12:
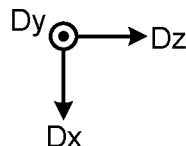

FIG. 12 is a schematic diagram illustrating a mechanism for identifying the dot image Lkx in the line image Li2 of the input image IA2. In the reduction processing, ΔLk is set such that ΔSk and ΔLk are in opposite directions with the optical axis Lz therebetween. In other words, the x-th pixel Pix and the dot image Lkx are located opposite to each other with the optical axis Lz therebetween.

In the enlargement processing, as illustrated in FIG. 10, the distance Ls is considered to be the distance on the display panel 2 side with respect to the parallax generator 8. The distance Ls in the enlargement processing is a positive value. On the other hand, in the reduction processing, the distance Ls is considered to be the distance on the side opposite to the display panel 2 with respect to the parallax generator 8, as illustrated in FIG. 12. The distance Ls in the reduction processing is a negative value. Specifically, in the input image IA2, to which the reduction processing is applied, the distance Ls is automatically derived as a negative value based on Ls=L1-L0 where the distance L1 is smaller than the reference distance L0. In the calculation processing by the arithmetic circuit 121, there is no particular difference between the enlargement processing and the reduction processing. The arithmetic circuit 121 can determine that the enlargement processing is applied when the distance Ls is a positive value while the reduction processing is applied when the distance Ls is a negative value. The arithmetic circuit 121 can thus determine the positional relation of ΔSk and ΔLk with respect to the optical axis Lz and the positional relation of the x-th pixel Pix and the dot image Lkx with respect to the optical axis Lz according to whether the distance Ls is a positive or negative value.

In an input image to which the reduction processing is applied, such as the input image IA2, the distance L1 corresponding to the position of the input image in the depth direction D is smaller than the reference distance L0. As a result, the magnification factor E, which is calculated by E=L1/L0 as described above, is less than 1. In other words, by applying the magnification change processing with the magnification factor E smaller than 1, the arithmetic circuit 121 applies the reduction processing to the line image Li2 included in the input image IA2.

Except for the points explained above, the reduction processing is performed in the same manner as the enlargement processing. By applying the distance Ls, the magnification factor E, the positional relation of ΔSk and ΔLk with respect to the optical axis Lz, and the positional relation of the x-th pixel Pix and the dot image Lkx with respect to the optical axis Lz, the arithmetic circuit 121 acquires the gradation value of the target pixel from the input image to which the reduction processing is applied, such as the input image IA2.

When a plurality of input images such as the input image IA1 and the input image IA2 are input side-by-side, the arithmetic circuit 121 acquires the gradation value of the target pixel from each of the input images individually. In other words, the gradation values are acquired for one target pixel, and the number of acquired gradation values corresponds to the number of input images that are input side-by-side. When the number of input images is equal to or larger than 2, i.e., when the input images are input on a line-image-by-line-image basis, the compositing circuit 122 generates a line image in which the gradation values of the target pixel acquired from the respective input images are composited. In FIG. 7, the input images IA1 and IA2 illustrated in the "input image" row are input as the input images, the line image Li1 of the input image IA1 and the line image Li2 of the input image IA2 illustrated in the "image processing (image)" row are composited through various types of processing, and the post-composition line image LAF illustrated in the "output image (display panel)" row is generated as the final result. The post-composition line image LAF is projected onto the front windshield FG, whereby the user Hu perceives the post-composition line image LAF as the projected line image SLA, as illustrated in the "visual perception (user)" row.

Figure 13:
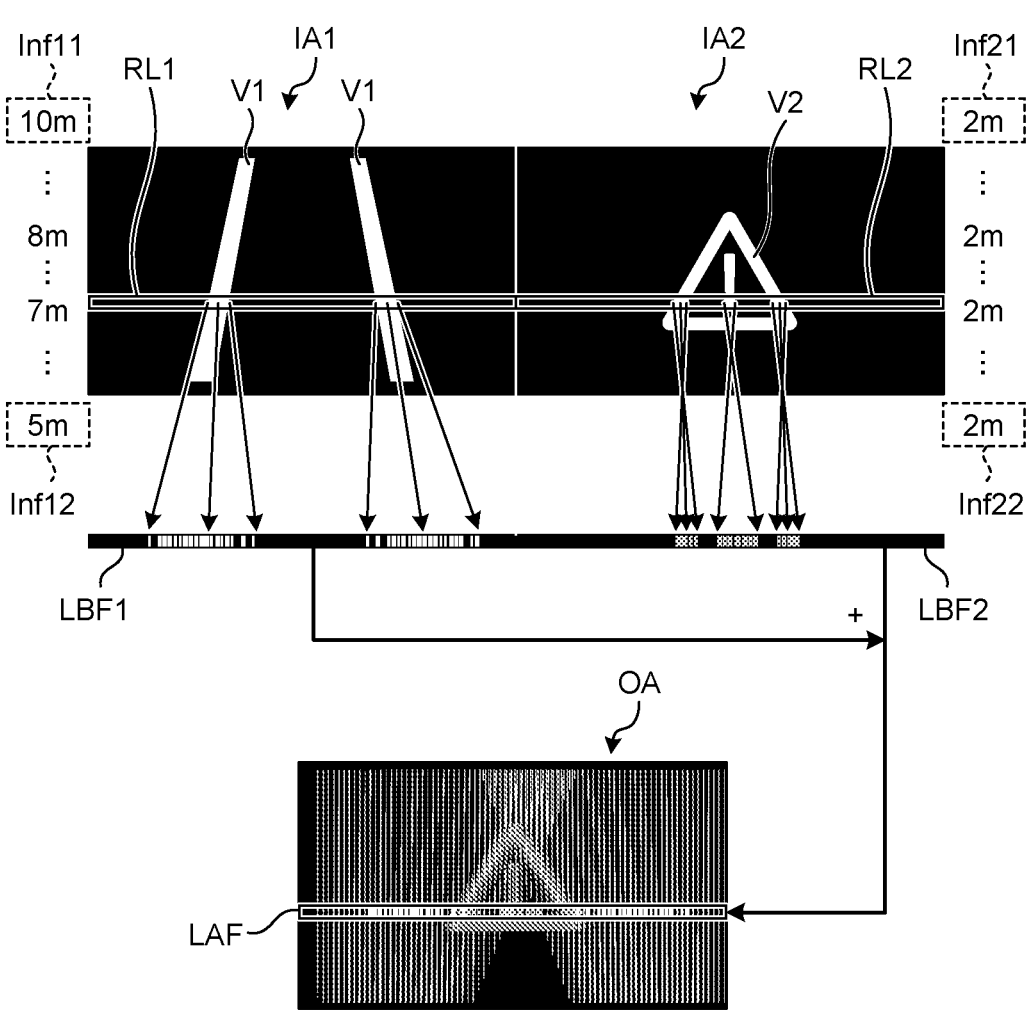
FIG. 13 is a schematic diagram illustrating a relation between pre-composition line images derived by an arithmetic circuit and a post-composition line image generated by a compositing circuit.

FIG. 13 is a schematic diagram illustrating the relation between the pre-composition line images LBF1 and LBF2 derived by the arithmetic circuit 121 and the post-composition line image LAF composited by the compositing circuit 122. The pre-composition line images LBF1 and LBF2 are line images derived by the arithmetic circuit 121 based on the line image RL1 of the input image IA1 and the line image RL2 of the input image IA2. The line image RL1 and the line image RL2 are input side-by-side as the input images for the same single line (input target line) in the display panel 2. The pre-composition line image LBF1 is generated when the arithmetic circuit 121 acquires the gradation values from the line image RL1 for all of the pixels Pix aligned in the horizontal direction H in the input target line of the display panel 2 in accordance with the procedure for acquiring the gradation value of the target pixel described with reference to FIGS. 8 to 11. The pre-composition line image LBF2 is generated when the arithmetic circuit 121 acquires the gradation values from the line image RL2 for all of the pixels Pix aligned in the horizontal direction H in the input target line of the display panel 2 in accordance with the procedure for acquiring the gradation value of the target pixel described with reference to FIGS. 8 to 11.

The compositing circuit 122 performs overlapping relation processing when compositing the pre-composition line image LBF1 and the pre-composition line image LBF2 to generate the post-composition line image LAF. The overlapping relation processing is image processing performed by the compositing circuit 122 to output corresponding to the overlapping relation in the depth direction D between input images, the overlapping relation being indicated by the positional information Inf set for each of the input images.

Specifically, when a plurality of gradation values each of which is not zero, i.e., (R, G, B)≠(0, 0, 0), are obtained as the gradation values of one target pixel, the compositing circuit 122 performs transparency processing or hiding processing when determining the gradation values of the one target pixel (specific target pixel).

The transparency processing is performed by the compositing circuit 122 to determine the gradation values of the target pixel such that image objects are seen as if a farther image object were seen through a closer image object. The farther image object is an image object provided with the positional information Inf indicating that the image object is farther away from the user Hu in the depth direction D. The closer image object is another image object provided with the positional information Inf indicating that the image object is closer to the user Hu in the depth direction D. The transmittance of the closer image object is predetermined. In other words, the degree to which the farther image object is seen through the closer image object, is predetermined. When the transparency processing is applied, the compositing circuit 122 composites the gradation value corresponding to the farther image object and the gradation value corresponding to the closer image object among the gradation values of the target pixel according to the transmittance of the closer image object and thus determines the gradation value of the specific target pixel. The specific algorithm for composition is the same as that for general image transparency processing. The details thereof are thus omitted.

The hiding processing is performed by the compositing circuit 122 to determine the gradation values of the target pixel such that image objects are seen as if a closest position image object hid a farther position image object. The closest position object is an image object to which the positional information Inf indicating that the image object is closer to the user Hu in the depth direction D is set. The farther position image object is another image object to which the positional information Inf indicating that the image object is farther away from the user Hu in the depth direction D is set. When the hiding processing is applied, the compositing circuit 122 determines the gradation value corresponding to the closest position image object as the gradation value of the specific target pixel.

In the overlapping relation processing, it is predetermined whether either the transparency processing or the hiding processing is applied. Whether either the transparency processing or the hiding processing is applied as the overlapping relation processing is determined by setting information recorded in advance in the image processing circuit 100. Such setting information may be provided so as to be changeable by an operation (input of a signal) from the host 200.

According to the embodiment, the compositing circuit 122 performs the overlapping relation processing. Thus, when a plurality of gradation values each of which is not zero, i.e., (R, G, B)≠(0, 0, 0), are acquired as the gradation values of one target pixel, the image object with the positional information Inf indicating that the position is closer to the user Hu in the depth direction D can be seen by the user Hu as if it were further on the near side.

When the number of times the gradation value that is not zero, i.e., (R, G, B)≠(0, 0, 0), is acquired as the gradation value of one target pixel is one, the compositing circuit 122 sets the gradation value (R, G, B)≠(0, 0, 0) as the gradation value of the one target pixel, without any specific processing. When all of the gradation values acquired as gradation values of one target pixel are zero, i.e., (R, G, B)=(0, 0, 0), the compositing circuit 122 sets the gradation value (R, G, B)=(0, 0, 0) as the gradation value of the one target pixel.

The overlapping relation processing described above is for the case where the gradation value of the image object in the input image is not zero, i.e., (R, G, B)≠(0, 0, 0), and the gradation value of the region where no image object exists (background) in the input image is zero, i.e., (R, G, B)=(0, 0, 0). The gradation value of the background may be a different gradation value. In this case, the gradation value of the image object may be zero, i.e., (R, G, B)=(0, 0, 0). In this case, the gradation value (R, G, B)=(0, 0, 0) in the above explanation is read as "background gradation value".

With the overlapping relation processing performed by the compositing circuit 122, the overlap of image objects corresponding to the positional information Inf added to each of the multiple input images can be visually perceived.

The following describes a relation between the processing sequence described above with reference to FIGS. 7 to 13 and the configuration of the image processing circuit 100 illustrated in FIG. 4.

First, input images are output from the host 200 to the image processing circuit 100 on a line-image-by-line-image basis. For example, the line image RL1 of the input image IA1 and the line image RL2 of the input image IA2 that are illustrated in FIG. 13 are output from the host 200 side-by-side. The input images output from the host 200 on a line-image-by-line-image basis are stored in the first line memory 111 of the image processing circuit 100. The line images stored in the first line memory 111 are copied in a collective manner to the second line memory 112. The arithmetic composition circuit 120 reads the line images (e.g., the line images RL1 and RL2) of the input images from the second line memory 112.

The host 200 also outputs the positional information Inf about the input images. The host 200 outputs the positional information Inf in time for the processing to be performed by the arithmetic composition circuit 120 based on the first line image of the input image (e.g., the line image on one end side). The host 200 may output the positional information Inf in parallel with the output of the first line image or may output the first line image and the positional information Inf at separate timings. In the embodiment, the positional information Inf indicating the positions on one end side and on the other end side of the input image is output at least in time for the processing to be performed on the first line image by the arithmetic composition circuit 120. The positional information Inf is input to the arithmetic composition circuit 120. As described above, the arithmetic circuit 121 calculates the position of each line image in the input image based on the positions on the one end side and on the other end side of the input image indicated by the positional information Inf and based on the number of line images in the vertical direction V. The arithmetic circuit 121 regards the calculated positions of the line images as the positional information Inf about the line images.

While the arithmetic composition circuit 120 performs the image processing, the line images of the input images to be subsequently processed are input to the first line memory 111. The input order of the line images of the input image is the order from the line image on one end side of the input image to the line image on the other end side of the input image, for example. The input order is not limited to this order and can be any predefined order.

The arithmetic circuit 121 and the compositing circuit 122 of the arithmetic composition circuit 120 perform image processing. Specifically, using the mechanism described above with reference to FIGS. 7 to 12, the arithmetic circuit 121 individually acquires, from each of the line images of the input images that have been input, the gradation value for each pixel Pix included in the line of the display panel 2 that displays the line image read from the second line memory 112. This allows the production of the pre-composition line image LBF1 from the line image RL1 and the pre-composition line image LBF2 from the line image RL2, for example (refer to FIG. 13). The compositing circuit 122 performs the overlapping relation processing based on the gradation values acquired by the arithmetic circuit 121. As a result, the post-composition line image LAF is generated from the pre-composition line images LBF1 and LBF2, for example. To take an actual processing example, the arithmetic circuit 121 generates the pre-composition line image LBF1 from the line image RL1 and stores the pre-composition line image LBF1 in the third line memory 113. The arithmetic circuit 121 then generates the pre-composition line image LBF2 from the line image RL2. The compositing circuit 122 reads the pre-composition line image LBF1 stored in the third line memory 113, receives the pre-composition line image LBF2 from the arithmetic circuit 121, and composites the pre-composition line image LBF1 and the pre-composition line image LBF2 to generate the post-composition line image LAF. The compositing circuit 122 overwrites the third line memory 113 with the post-composition line image LAF. When the number (q) of input images to be composited is equal to or larger than three, the (q−1)th post-composition line image obtained by compositing the first to (q−1)th line images is stored in the third line memory 113 based on the processing flow, and the q-th line image is generated by the arithmetic circuit 121. The compositing circuit 122 reads the (q−1)th post-composition line image stored in the third line memory 113, receives the q-th line image from the arithmetic circuit 121, and composites the (q−1)th post-composition line image read from the third line memory 113 and the q-th line image to generate the q-th post-composition line image in which the first to q-th line images are composited. Thus, each of the first line memory 111, the second line memory 112, the third line memory 113, and the fourth line memory 114 only needs to have a storage capacity enough to store one line image of each of the input images to be composited. This can prevent an increase in the capacities of these line memories.

The line image after the overlapping relation processing by the compositing circuit 122, i.e., the line image of the output image (e.g., the post-composition line image LAF), is output to the third line memory 113. The line image stored in the third line memory 113 is copied into the fourth line memory 114 in accordance with a predetermined operating clock of the image processing circuit 100. The line image stored in the fourth line memory 114 is output to the driver IC 3 in accordance with a predetermined operating clock of the image processing circuit 100. The driver IC 3 causes the display panel 2 to output a display corresponding to the input line image. As a result, a line image corresponding to the post-composition line image LAF is output (refer to FIGS. 7 and 13). The same processing is performed on all of the line images included in the input images, whereby the output image OA is projected onto the projection position PR of the front windshield FG (refer to FIGS. 7 and 13). The user Hu views the output image OA, and perceives the image object Vi, which includes the image objects V1 and V2, as illustrated in the "visual perception (user)" row in FIG. 7.

The above description is a case where the number of input images is two. Even when the number of input images is equal to or larger than three, the arithmetic circuit 121 acquires the gradation values of the target pixel individually from the line images of each of the three or more input images, and the compositing circuit 122 applies the overlapping relation processing to the gradation values for each target pixel. This allows the user Hu to view the image object Vi, in which the image objects in each of the three or more input images are composited. The number of input images may be one. In such a case, the gradation value acquired from the input image is used as the gradation value of the target pixel as it is. The storage capacity of each of the first line memory 111, the second line memory 112, the third line memory 113, and the fourth line memory 114 is the storage capacity corresponding to one line image of each of the input images to be composited as described above, for example. The storage capacity is just an example and is not limited to this example. The storage capacity may be larger than this example. The format of the line images of the input image is preliminarily defined.

Figure 14:
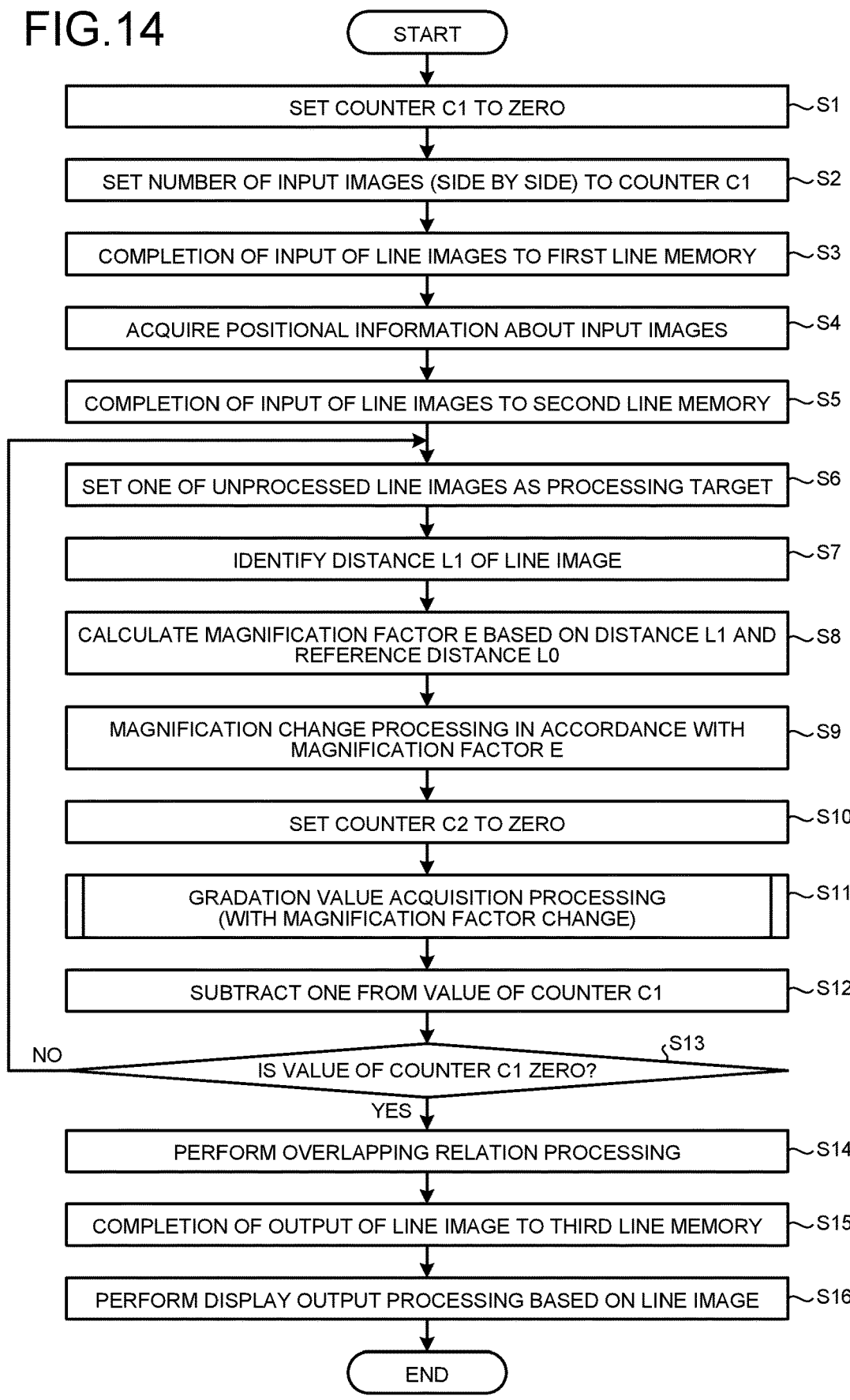
FIG. 14 is a flowchart illustrating an exemplary sequence of main processing by an image processing circuit.
Figure 15:
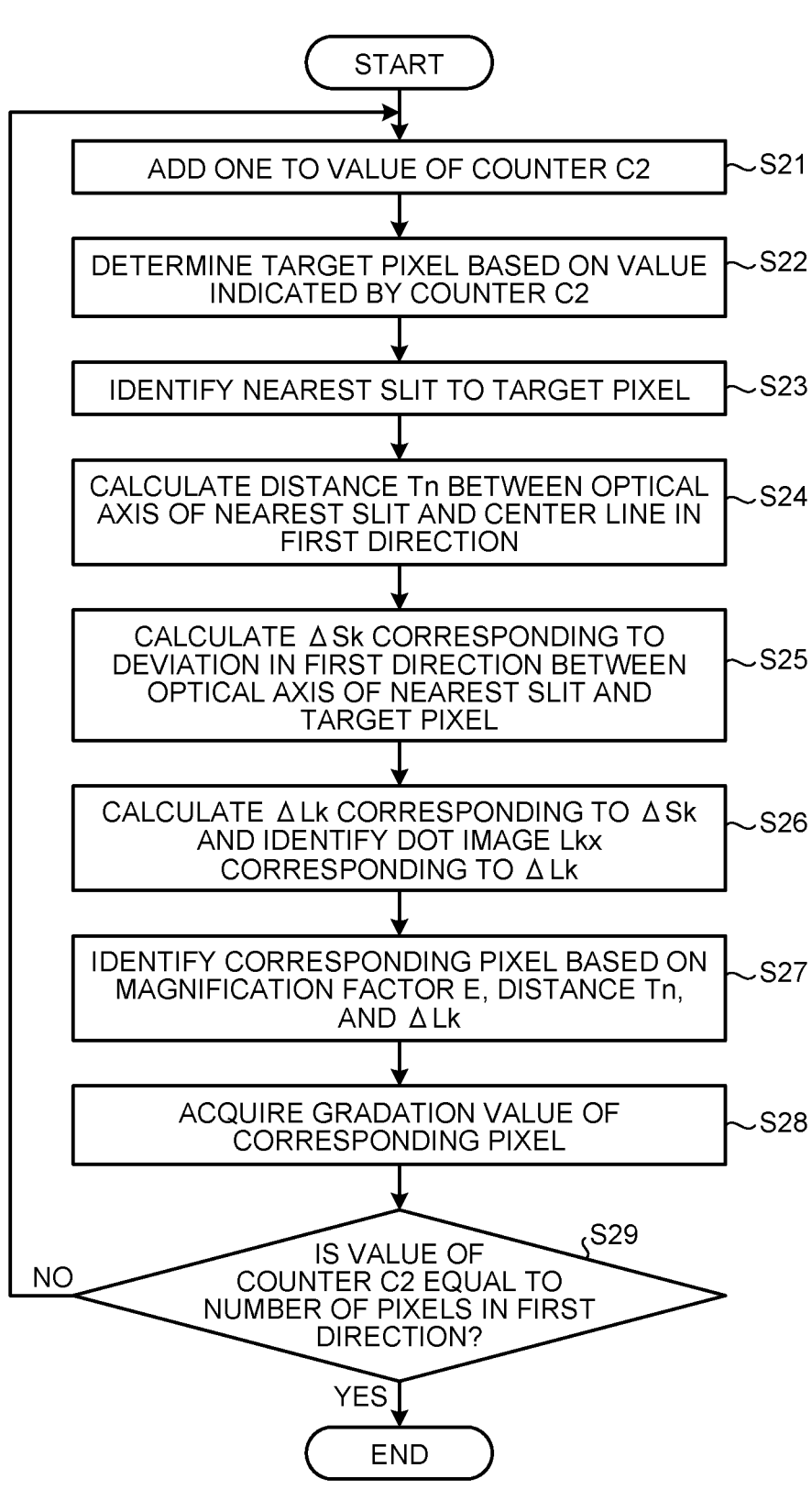
FIG. 15 is a flowchart illustrating an exemplary gradation value acquisition processing (with magnification factor change) illustrated in FIG. 14.

The following describes an example of a sequence of processing by the image processing circuit 100 with reference to the flowcharts in FIGS. 14 and 15.

FIG. 14 is a flowchart illustrating an exemplary sequence of main processing by the image processing circuit 100. The arithmetic circuit 121 sets a counter C1 to an initial value of zero (step S1). The arithmetic circuit 121 sets the number of input images to be input and composited to the counter C1 (step S2). For example, when two input images of the input images IA1 and IA2 are input as illustrated in FIG. 7, the value of the counter C1 becomes two by the processing at step S2. The line images of the input images output from the host 200 are stored in the first line memory 111 (step S3).

The arithmetic composition circuit 120 acquires the positional information Inf added to the input images (step S4). As described above, the arithmetic circuit 121 calculates the position of each line image in the input image based on the positions on the one end side and on the other end side of the input image indicated by the positional information Inf, and the number of line images in the vertical direction V. The arithmetic circuit 121 regards the calculated positions of the line images as the positional information Inf about the line images. The positional information Inf acquired by the processing at step S4 is used by both the arithmetic circuit 121 and the compositing circuit 122. The line images input to the first line memory 111 by the processing at step S3 are stored in the second line memory 112 (step S5). The processing at step S4 and the processing at step S5 are performed in no particular order.

The arithmetic circuit 121 sets one of the line images of the input images stored in the second line memory 112 by the processing at step S5 as the processing target (step S6). Thereafter, the processing from step S7 to step S12 is performed on the line image set as the processing target by the processing at step S6.

First, the distance L1 of the processing target line image is identified based on the positional information Inf acquired at step S5 (step S7). For example, in a case of the line image at the one end in the vertical direction V of the input image IA1 illustrated in the "input image" row in FIG. 7, L1 is identified as 10 m. In a case of the line image at the other end in the vertical direction V of the input image IA1, L1 is identified as 5 m. In a case of a line image between the one end and the other end in the vertical direction V of the input image IA1, the distance L1 is calculated by interpolation processing based on the positional information Inf11 and Inf12.

The arithmetic circuit 121 calculates the magnification factor E based on the distance L1 and the reference distance L0 (step S8). The arithmetic circuit 121 performs the magnification change processing on the processing target line image in accordance with the magnification factor E calculated at step S8 (step S9). Specifically, if E>1, the enlargement processing described above is performed as the magnification change processing. If E<1, the above reduction processing is performed as the magnification change processing. If E=0, the enlargement processing or the reduction processing may be performed with a magnification factor of 1. This is, however, substantially the same as not changing the magnification factor in the horizontal direction H of the line image. Therefore, the processing at step S8 may be omitted.

The arithmetic circuit 121 sets a counter C2, which is different from the counter C1, to an initial value of zero (step S10). The arithmetic circuit 121 performs gradation value acquisition processing (with magnification factor change) (step S11). The gradation value acquisition processing (with magnification factor change) is processing of acquiring the gradation value for each target pixel, while handling each of the pixels Pix included in the line of the display panel 2, which displays the line image of the input image, as the target pixel.

FIG. 15 is a flowchart illustrating an exemplary gradation value acquisition processing (with magnification factor change) illustrated in FIG. 14. The arithmetic circuit 121 adds one to the value of the counter C2 (step S21). The arithmetic circuit 121 determines the target pixel based on the value indicated by the counter C2 (step S22). Specifically, the target pixel is the "counter C2 value"-th pixel Pix counted from the one end side in the first direction Dx in the line of display panel 2 that displays the line image of the input image. Thereafter, the processing from step S23 to step S28 is performed on the pixel Pix set as the target pixel by the processing at step S22.

The arithmetic circuit 121 identifies the nearest slit 82 to the target pixel based on equations (1) and (2) (step S23). For example, the "T-th slit 82" is identified as the nearest slit 82 to the target pixel. The arithmetic circuit 121 calculates the distance Tn as the distance between the optical axis Lz of the nearest slit 82 identified by the processing at step S23 and the center line CL (step S24). Specifically, the arithmetic circuit 121 calculates the distance Tn based on equation (5). The arithmetic circuit 121 calculates ΔSk corresponding to the deviation in the first direction Dx between the optical axis Lz of the nearest slit 82 identified by the processing at step S23 and the pixel Pix identified as the target pixel by the processing at step S22 (step S25).

Specifically, the arithmetic circuit 121 calculates ΔSk based on equation (4). The processing at step S24 and the processing at step S25 are performed in no particular order.

The arithmetic circuit 121 calculates ΔLk corresponding to ΔSk calculated by the processing at step S25, and identifies the dot image Lkx located at the position corresponding to ΔLk in the line image to which the magnification change processing is applied by the processing at step S9 (step S26). Specifically, the arithmetic circuit 121 calculates ΔLk based on equation (3). As illustrated in the example in the "line image after enlargement processing (magnification factor E)" row in FIG. 11, the arithmetic circuit 121 identifies the dot image Lkx in the line image subjected to the magnification change processing, based on the center line CL, the distance Tn, and ΔLk.

The arithmetic circuit 121 identifies the corresponding pixel of the pixel Pix identified as the target pixel by the processing at step S22, based on the magnification factor E calculated by the processing at step S8, the distance Tn calculated by the processing at step S24, and ΔLk calculated by the processing at step S26 (step S27). Specifically, as illustrated in the example in the "line image before enlargement processing" row in FIG. 11, the arithmetic circuit 121 identifies, as the corresponding pixel, the dot image Rx located at a distance of (Tn+ΔLk)/E from the center line CL in the processing target line identified by the processing at step S6. The arithmetic circuit 121 acquires the gradation value of the dot image (e.g., the dot image Rx) identified as the corresponding pixel at step S27 (step S28).

The arithmetic circuit 121 determines whether the value of the counter C2 is equal to the number of pixels in the first direction Dx in the display panel 2 (step S29). If it is determined that the value of the counter C2 is not equal to the number of pixels in the first direction Dx in the display panel 2 (No at step S29), the arithmetic circuit 121 proceeds to the processing at step S21. The value of the counter C2 is increased in increments of one by repeating the processing at step S21. This operation shifts the target pixel from one end side to the other end side in the first direction Dx one by one, and the processing at steps S22 to S28 is repeated until the pixel located at the other end in the first direction Dx is identified as the target pixel. On the other hand, if it is determined that the value of the counter C2 is equal to the number of pixels in the first direction Dx in the display panel 2 (Yes at step S29), the arithmetic circuit 121 ends the gradation value acquisition processing (with magnification factor change) at step S11.

After completion of the gradation value acquisition processing (with magnification factor change) at step S11, the arithmetic circuit 121 subtracts one from the value of the counter C1 (step S12), as illustrated in FIG. 14. The arithmetic circuit 121 determines whether the value of the counter C1 is zero (step S13). If it is determined that the value of the counter C1 is not zero (No at step S13), the processing proceeds to step S6. In the processing at step S6 after the proceeding, the line image from which the gradation values are not yet acquired is the processing target. For example, in a case where the line image RL1 of the input image IA1 is set as the processing target in the processing at the step S6 performed firstly, the line image RL2 of the input image IA2 is set as the processing target in the processing at step S6 subsequently performed after the processing performed on the line image RL1.

To take a specific example with reference to FIG. 13, the processing from step S6 to step S12 is performed after the line image RL1 of the input image IA1 is set as the processing target by the processing at the step S6 firstly performed. As a result, the pre-composition line image LBF1 is generated. The processing from step S6 to step S12 is performed after the line image RL2 of the input image IA2 is set as the processing target by the processing at step S6 performed subsequently after the processing performed on the line image RL1. As a result, the pre-composition line image LBF2 is generated.

On the other hand, if it is determined that the value of the counter C1 is zero by the processing at step S13 (Yes at step S13), the compositing circuit 122 performs the overlapping relation processing (step S14). For example, as explained with reference to FIG. 13, the compositing circuit 122 generates the post-composition line image LAF from the pre-composition line images LBF1 and LBF2. If the image object V1 and the image object V2 overlap in the positional relation, the compositing circuit 122 performs the transparency processing or the hiding processing.

The compositing circuit 122 outputs the line image (e.g., the post-composition line image LAF) generated by the processing at step S14 to the third line memory 113 (step S15). The display output processing is then performed based on the line image output to the third line memory 113 (step S16). Specifically, the line image stored in the third line memory 113 is copied into the fourth line memory 114 in accordance with a predetermined operating clock of the image processing circuit 100. The line image stored in the fourth line memory 114 is output to the driver IC 3 in accordance with a predetermined operating clock of the image processing circuit 100. The driver IC 3 causes the display panel 2 to output a display corresponding to the input line image.

As described above, the image processing is performed by the image processing circuit 100 on one line image out of the lines included in the output image OA by following the processing sequence described with reference to FIGS. 14 and 15. The image processing circuit 100 repeats the same processing on the line images sequentially received from the host 200. The display output processing is performed on all of the line images included in the output image OA, whereby the output image OA is projected onto the projection position PR.

The exemplary explanation described above is based on the case where the image processing circuit 100 includes the line memories such as the first line memory 111, the second line memory 112, the third line memory 113, and the fourth line memory 114 as a configuration for storing input images. The configuration, however, is not limited thereto. The configuration corresponding to each of the first line memory 111, the second line memory 112, the third line memory 113, and the fourth line memory 114 may be a memory capable of storing a plurality of line images together or a memory capable of storing input images of one frame together. In such a case, the image processing of the image processing circuit 100 is performed not on a line image basis but on a predetermined amount of image basis corresponding to the storage capacity of the memory.

The frame rate of the display device 1 is arbitrary. Multiple pieces of frame image data are sequentially output from the host 200 as the input images. In other words, the host 200 outputs the line images of the input images that constitute one frame of frame image data over a time period corresponding to one frame period, and then outputs the line images of the input images that constitute one frame of frame image data over the next one frame period. The positional information Inf is added to each frame image data individually.

The pieces of positional information Inf that are respectively added to the pieces of frame image data may be different from one another. For example, as illustrated in the "input image" row of FIG. 7, the positional information Inf21 and the positional information Inf22 indicating "2 m" are added to the input image IA2, but the positional information Inf21 and the positional information Inf22 may be changed to indicate a position in the depth direction D different from "2 m" (for example, 2.5 m) for the next frame image data. In this way, the positional information Inf added to each of the consecutive input images is changed, thereby making it possible for the user Hu to perceive the image object as if it were moving in the depth direction D. In FIG.

1, the double pointed arrow arranged below the image object V2 schematically indicates such a movement along the depth direction D.

In the explanations described above, the interpolation processing based on the difference between the position on the one end side and the position on the other end side in the vertical direction V, such as the relation between the positional information Inf11 and Inf12, is taken into consideration. There may be a difference between the position on the one end side and the position on the other end side in the horizontal direction H as well. This case is described later with reference to FIG. 16. For example, in FIG. 7, the position indicated by the positional information Inf11 and the position indicated by the positional information Inf13 of the input image IA1 are both 10 m and equal. The position indicated by the positional information Inf11 and the position indicated by the positional information Inf13 may be different. In this case, the difference between the position indicated by the positional information Inf11 and the position indicated by the positional information Inf13 is the difference in the depth direction D between the position on the one end side and the position on the other end side of the input image IA1 in the horizontal direction H. Likewise, the position in the depth direction D indicated by the positional information Inf21 and the position in the depth direction D indicated by the positional information Inf23 may be different.

Figure 16:
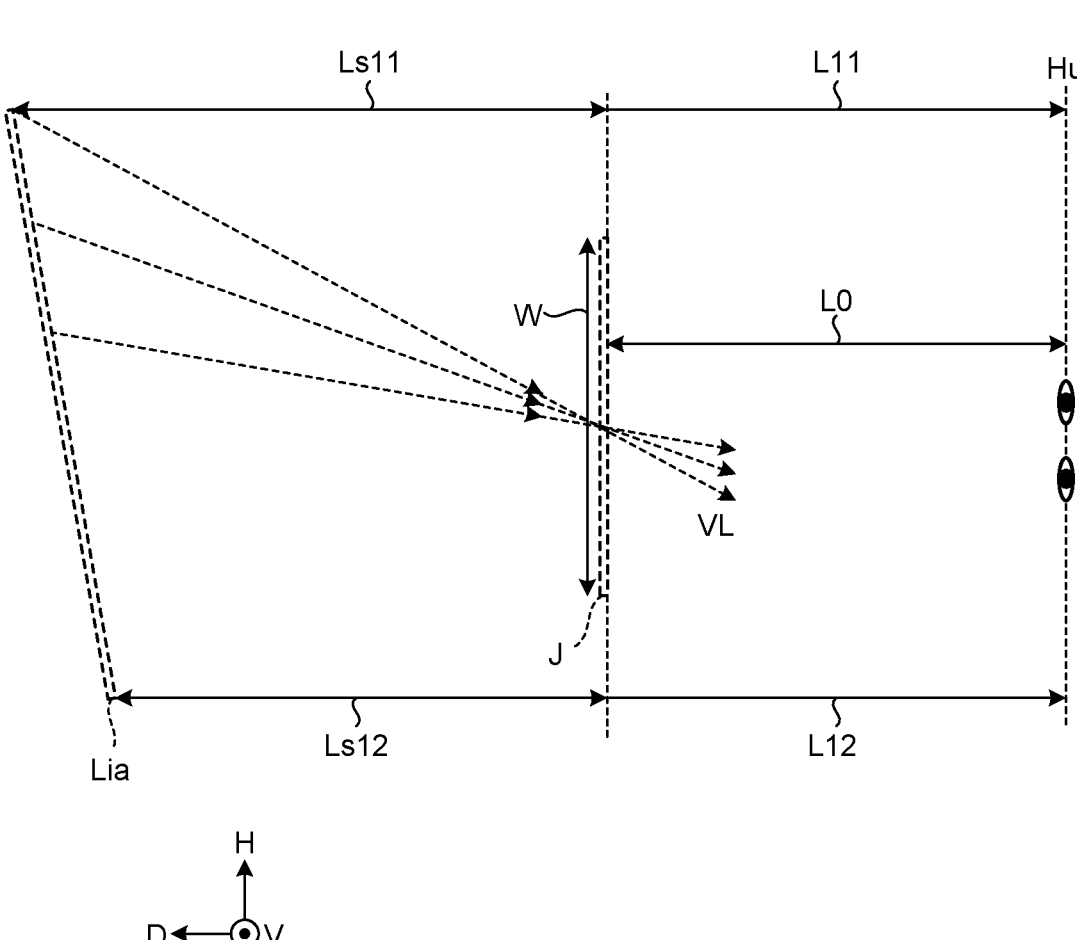
FIG. 16 is a schematic diagram illustrating a mechanism for calculation corresponding to a difference between the position on one end side and the position on the other end side in a horizontal direction.

FIG. 16 is a schematic diagram illustrating a mechanism of the calculation corresponding to the difference between the position on the one end side and the position on the other end side in the horizontal direction H. The line image Lia illustrated in FIG. 16 is equivalent to the line image Li1 except that the position indicated by the positional information Inf11 differs from that indicated by the positional information Inf13.

When the position indicated by positional information Inf11 is different from the position indicated by positional information Inf13, the distance L11 in the depth direction D from the user Hu to the one end in the horizontal direction H of the line image Lia is different from the distance L12 in the depth direction D from the user Hu to the other end in the horizontal direction H of the line image Lia, as illustrated in the positional relation between the line image Lia and the user Hu in FIG. 16. Thus, the distance Ls11 in the depth direction D from the reference display position J to the one end in the horizontal direction H of the line image Lia is also different from the distance Ls12 in the depth direction D from the reference display position J to the other end in the horizontal direction H of the line image Lia. The dot images that are included in the line image Lia and located between the one end and the other end in the horizontal direction H also have different distances from one another to the user Hu and the reference display position J in the depth direction D.

The dot images included in the line image Li1 (refer to FIG. 8) each have the distance Ls common to each other. For each of the dot images included in the line image Lia illustrated in FIG. 16, the distance from the reference display position J in the depth direction D is individually calculated. For example, the method for deriving the distance Ls11 in the depth direction D from the reference display position J to the one end in the horizontal direction H of the line image Lia is the same as the method for deriving the distance Ls described above. On the other hand, the distance Ls12 in the depth direction D from the reference display position J to the other end in the horizontal direction H of the line image Lia is calculated by reflecting, into the distance Ls11, the difference between the positions indicated by the positional information Inf11 and Inf13. For example, when the position in the depth direction D indicated by the positional information Inf11 is 12 m while the position in the depth direction D indicated by the positional information Inf13 is 10 m, the difference between the positional information Inf11 and Inf13 is 2 m, which means that the distance at the one end is longer, i.e., the difference is plus (+). In this case, the distance Ls11 is calculated by adding 2 m to the distance Ls12. The distance in the depth direction D to the reference display position J of each of the dot images that are included in the line image Lia and located between the one end and the other end in the horizontal direction H is determined individually by the interpolation processing based on the difference between the distances Ls11 and Ls12. Such calculation of the distance for each dot image in the depth direction D to the reference display position J is performed by the arithmetic circuit 121.

The arithmetic composition circuit 120 holds in advance various types information referred by the various types processing performed by the arithmetic composition circuit 120, such as the position, the interval Ws, the interval (d), and the reference distance L0 regarding the slit 82 in the parallax generator 8, and the pitch of pixel Pix in the display panel 2.

According to the embodiment described above, the display device 1 includes: the display panel (e.g., the display panel 2) displaying the third image (e.g., the output image OA) that is a composite of the first image (e.g., the input image IA1) and the second image (e.g., the input image IA2); the parallax generator (the parallax generator 8 or the parallax generator 8A) that generates parallax of the first image and parallax of the second image; and the projection destination part (e.g., the front windshield FG) onto which projection light (the light L) emitted from the display side of the display panel and modulated by the parallax generator is projected. Thus, the parallax generator generates the parallax of the first image and the parallax of the second image, whereby it is possible for the display device 1 to reproduce a 3D spatial overlapping of the images (the first and the second images).

The light L from the display panel (e.g., display panel 2) is projected onto the projection destination part (e.g., the front windshield FG). The parallax generator (the parallax generator 8 or the parallax generator 8A) is located on the projection destination side of the display panel. Positional information (the positional information Inf) is added to each of the first image (e.g., the input image IA1) and the second image (e.g., the input image IA2). The positional information indicates the virtual position of the image in the depth direction (depth direction D). The display device further includes the image processing circuit (e.g., the image processing circuit 100) that composites the first and the second images based on the positional information to generate the third image (e.g., the output image OA) and causes the display panel to display the third image. This allows the display device 1 to project the third image in which the positional relation between the first and the second images in the depth direction D indicated by the positional information is reflected.

The positional information (the positional information Inf) includes the information (e.g., the positional information Inf11 and Inf12) that indicates the positional relation between two different points in one of the two directions orthogonal to the depth direction (depth direction D), i.e., the vertical direction V and the horizontal direction H. The image processing circuit (e.g., the image processing circuit 100) generates the third image (e.g., the output image OA)

in which the positional relation between the two points is reflected. This makes it possible to generate the third image in which a state is reflected where each pre-composition image (the first and the second images) is slanted in the vertical or the horizontal direction.

The positional information further includes the information about one point (e.g., the positional information Inf13) that indicates a different positional relation with respect to the two points in the other of the vertical direction V and the horizontal direction H. The image processing circuit (e.g., the image processing circuit 100) generates the third image in which the positional relation between the two points and the one point is reflected. This makes it possible to generate the third image in which a state is reflected where each pre-composition image (the first and the second images) is slanted in the vertical and the horizontal direction.

The image processing circuit (e.g., the image processing circuit 100) performs the transparency processing or the hiding processing on the area where the first image (e.g., the input image IA1) and the second image (e.g., the input image IA2) overlap. The transparency processing ensures that the image on the near side does not completely hide the other images on the far side in the depth direction D, thus making it possible for display output not to interfere with information display by the other images. The hiding processing allows for a more realistic reproduction of the positional relation by hiding the other images on the far side with the image on the near side in the depth direction D.

The first image (e.g., the input image IA1) and the second image (e.g., the input image IA2) are input to the image processing circuit (e.g., the image processing circuit 100) on a line-image-by-line-image basis. The image processing circuit generates the third image (e.g., the output image OA) on a line-image-by-line-image basis. The display panel has the line memories (e.g., the first line memory 111, the second line memory 112, the third line memory 113, and the fourth line memory 114). This makes the storage capacity necessary for storing images before and after processing by the image processing circuit smaller than that in a case where the images are stored on a frame-image-by-frame-image basis.

In addition, according to the embodiment, the magnification change processing makes it possible to reflect the forms of the first image (e.g., the input image IA1) and the second image (e.g., the input image IA2), which are input images, in the third image (e.g., the output image OA) as they are. In other words, the size of each image in the third image is prevented from being changed by the positional information (the positional information Inf) added to the first and the second images. This makes it possible to employ, as the input images to the image processing circuit (the image processing circuit 100), the first and the second images having the shape and size to be included in the third image. As a result, the form of the third image can be more easily recalled from the first and the second images, and the preparation of the first and the second images by back-calculating changes in shape and size, which is performed when generating the third image, becomes unnecessary. Thus, the preparation of the first and the second images is easier.

Modifications

The following describes modifications of the embodiment with reference to FIGS. 17 to 22. In the description of the modifications, the same components as in the embodiment described above may be denoted with the same symbols, and descriptions thereof may be omitted.

Figure 17:
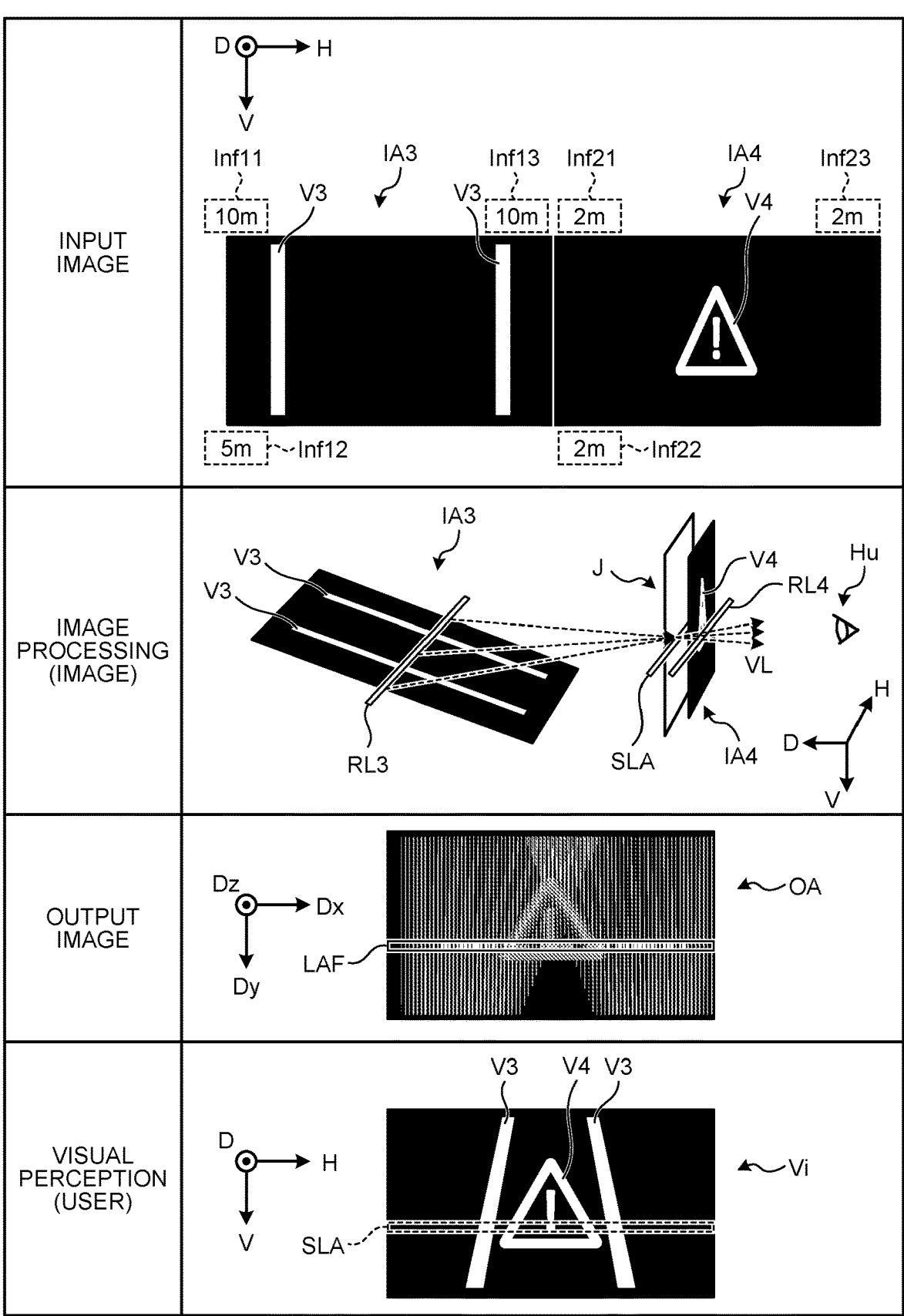
FIG. 17 is a schematic diagram illustrating an exemplary relation between the "image processing (image)", the "output image (display panel)", and the "visual perception (user)" in a modification.

FIG. 17 is a schematic diagram illustrating an exemplary relation between the "image processing (image)", the "output image (display panel)", and the "visual perception (user)" in a modification. The example of the "input image" illustrated in FIG. 17 is assumed to obtain, by the processing performed by the arithmetic composition circuit 120 in the modification, the same "visual perception" of the user Hu as in the embodiment. The positional information Inf11, Inf12, and Inf13, which are the positional information Inf added to the input image IA3 illustrated in the "input image" row in FIG. 17, are the same as those added to the input image IA1 in the embodiment illustrated in FIG. 7. The positional information Inf21, Inf22, and Inf23, which are the positional information Inf added to the input image IA4 illustrated in the "input image" row in FIG. 17, are the same as those added to the input image IA2 in the embodiment illustrated in FIG. 7. The input image IA3 is an example of the first image. The input image IA4 is an example of the second image.

The magnification change processing, which is performed in the embodiment, is not performed in the modification. The input image IA3 illustrated in the "image processing (image)" row of FIG. 17 is not subjected to the enlargement processing. The input image IA3 thus has a parallelogram shape where the width in the horizontal direction H on one end side of the reference display position J and the width in the horizontal direction H on the other end side of the reference display position J are equal. In contrast, the input image IA1 in the "image processing (image)" row of FIG. 7 has a trapezoidal shape according to the difference between the positional information Inf11 and the positional information Inf12 due to the enlargement processing.

As described above, the 3D image provides a perspective display in which image objects farther away in the depth direction D are displayed smaller and image objects closer in the depth direction D are displayed larger. Therefore, the one end of the input image IA3 at a position of (10 m) relatively farther away in the depth direction D, is reduced and displayed so that the width in the horizontal direction H thereof is smaller than that of the other end of the input image IA3 at a position of (5 m) relatively closer in the depth direction D. As a result, the two image objects V3 in a parallel positional relation in the "input image" row are perceived as the image objects with such an inclination that the interval between the one ends in the vertical direction V is relatively narrower than the interval between the other ends, as illustrated in the "visual perception (user)" row. The image object V4 in the input image IA4 has the positional information Inf indicating a position closer than the reference display position J, in the same manner as the image object V2 in the embodiment. Thus, the image object V4 is displayed with the output image OA such that the size illustrated in the "visual perception (user)" row is perceived as larger than the size illustrated in the "input image" row.

The magnification change processing is not performed in the modification. Thus, as is clear from the difference between FIGS. 7 and 17, in the modification, the input image IA1 in the embodiment is replaced by the input image IA3. As illustrated in the "image processing (image)" row in FIG. 17, in the modification, the line image RL3 of the input image IA3 is composited with the line image RL4, and the composited image is projected to be viewed as a single projected line image SLA.

Figure 18:
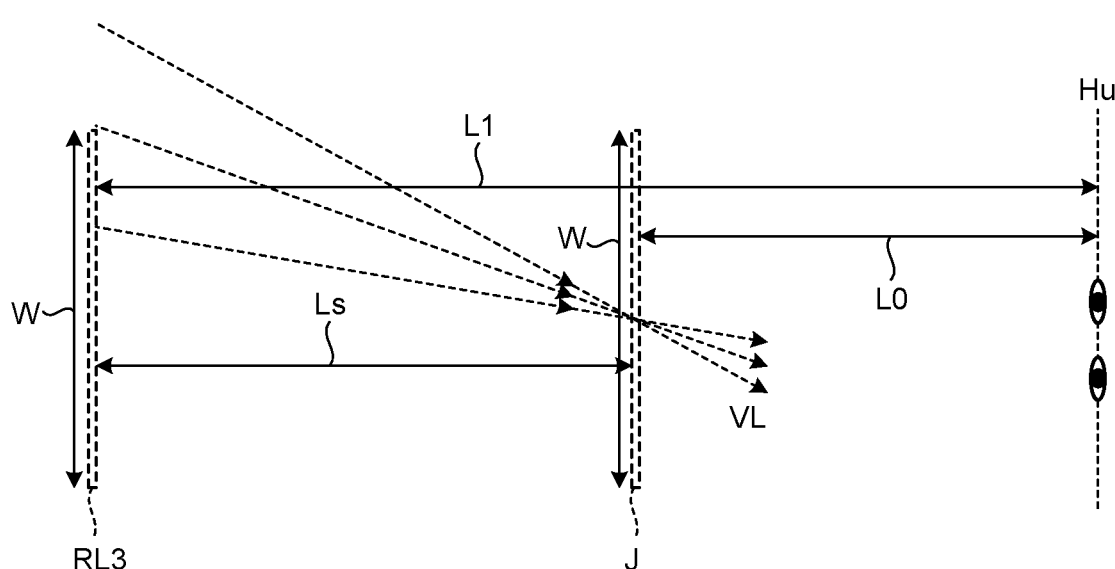
FIG. 18 is a schematic diagram illustrating a relation between the reference display position and the line image in the modification.
Figure 18:
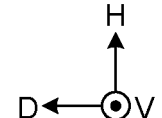

FIG. 18 is a schematic diagram illustrating a relation between the reference display position J and the line image RL3 in the modification. The magnification change processing is not performed in the modification. The width W in the horizontal direction H of the line image RL3 is thus the same as the width W of the reference display position J. The configuration illustrated in FIG. 18 is the same as that illustrated in FIG. 8, except that the line image Li1 in FIG. 8 is replaced by the line image RL3. In other words, the concept of the distance L1, the reference distance L0, the distance Ls, and the like in the modification is the same as that in the embodiment.

Figure 19:
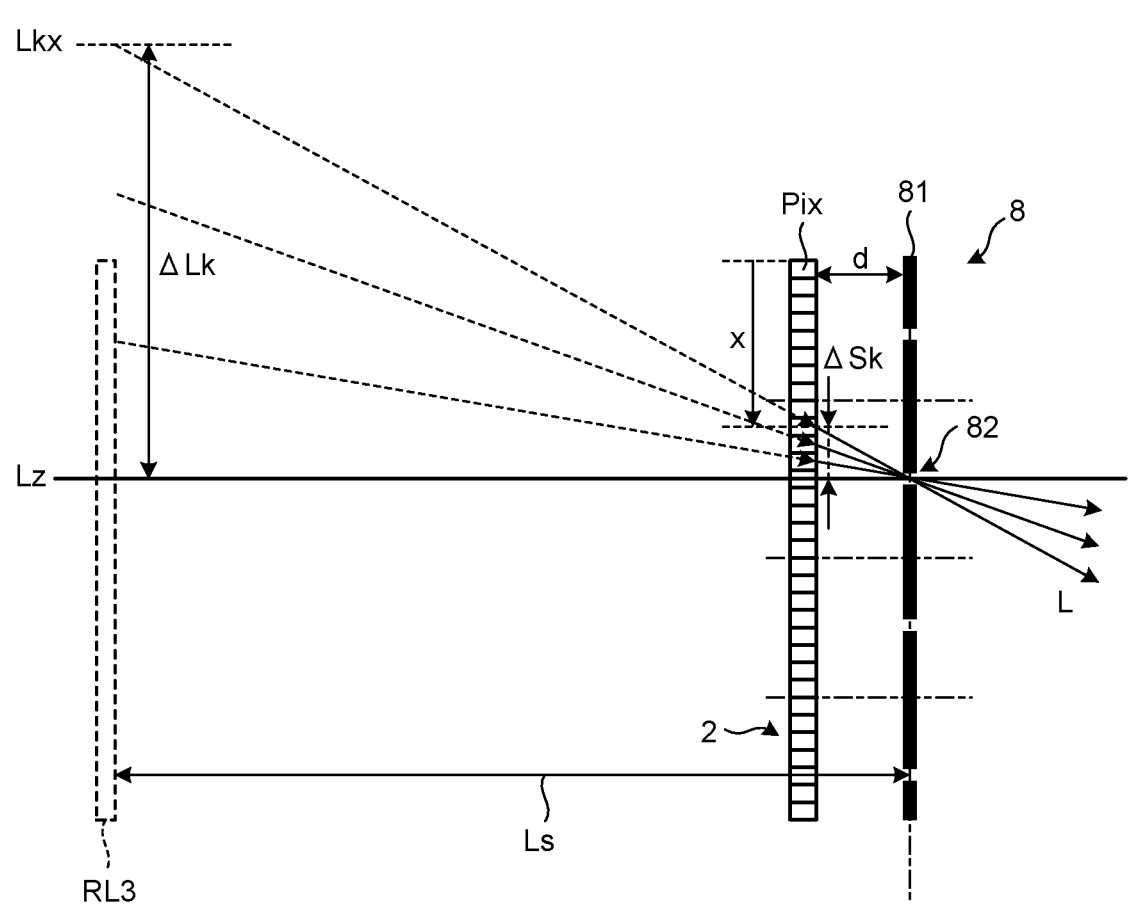
FIG. 19 is a schematic diagram illustrating a relation between the line image and the gradation values of pixels aligned in the first direction in the display panel.
Figure 19:
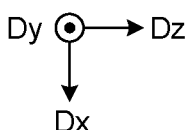

FIG. 19 is a schematic diagram illustrating a relation between the line image RL3 and the gradation values of the pixels Pix aligned in the first direction Dx in the display panel 2. The configuration illustrated in FIG. 19 is the same as that illustrated in FIG. 10, except that the line image Li1 in FIG. 10 is replaced by the line image RL3. In other words, the concept of $\Delta$Lk, $\Delta$Sk, and the like in the modification is the same as that in the embodiment. However, in the modification, the magnification change processing such as the enlargement processing is not performed. Therefore, the line image RL3 illustrated in FIG. 19 is not located at the position where the dot image Lkx exists in the embodiment (refer to FIG. 10). In such a case, the gradation value given to the x-th pixel Pix is the same as the background (e.g., (R, G, B)=(0, 0, 0)).

Figure 20:
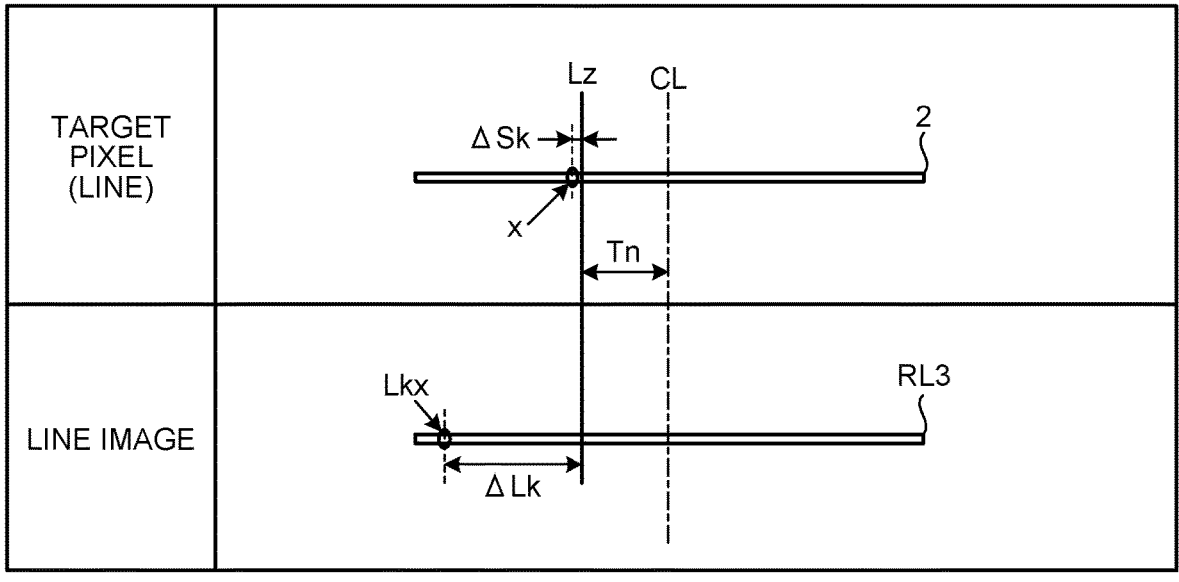
FIG. 20 is a schematic diagram illustrating a concept of the coordinate transformation processing in the modification.

FIG. 20 is a schematic diagram illustrating a concept of the coordinate transformation processing in the modification. In the same manner as the embodiment, the pixel Pix for which a gradation value is to be determined is set as the target pixel by the arithmetic circuit 121 of the modification. The x-th pixel Pix is assumed to be the target pixel. In the same manner as the embodiment, the arithmetic circuit 121 identifies the nearest slit 82 to the x-th pixel Pix. The nearest slit 82 is, for example, the T-th slit 82 described above as in the embodiment. The arithmetic circuit 121 calculates $\Delta$Sk using equation (4), in the same manner as the embodiment. The arithmetic circuit 121 calculates $\Delta$Lk using equation (3) in the same manner as the embodiment. The arithmetic circuit 121 calculates the distance Tn between the center line CL and the T-th slit 82 using equation (5) in the same manner as the embodiment.

The arithmetic circuit 121 identifies the dot image Lkx located at the position from the center line CL in the line image by a distance obtained by adding the distance Tn and $\Delta$Lk. In other words, the arithmetic circuit 121 calculates Tn+$\Delta$Lk and identifies the dot image Lkx located at the position from the center line CL in the line image RL3 by a distance of (Tn+$\Delta$Lk). The arithmetic circuit 121 acquires the gradation value of the dot image Lkx as the gradation value of the x-th pixel Pix, i.e., the target pixel. When a target pixel is on the one end side of the user Hu with respect to the center line CL, the arithmetic circuit 121 identifies the dot image Lkx located at a position of (Tn+$\Delta$Lk) from the center line CL toward the one end side in the line image RL3. When a target pixel is on the other end side of the user Hu with respect to the center line CL, the arithmetic circuit 121 identifies the dot image Lkx located at a position of (Tn+$\Delta$Lk) from the center line CL toward the other end side in the line image RL3. As explained with reference to FIG. 19, when the dot image Lkx is not located in the line image RL3, the gradation value given to the x-th pixel Pix is the same as the background (e.g., (R, G, B)=(0, 0, 0)). The explanation with reference to FIGS. 18 to 20 relates to the line image of the input image (e.g., the line image RL3) to which the positional information Inf indicating that the line image is farther away than the reference display position J is added. As explained with reference to FIG. 20, by determining the gradation value of the x-th pixel Pix, the image object is reduced in the horizontal direction H, as illustrated in the corresponding relation between the image object V3 in the "input image" row and the image object V3 in the "visual perception (user)" row in FIG. 17.

For the line image of the input image to which the positional information Inf indicating that the input image is closer than the reference display position J is added (e.g., the line image RL4), ΔLk is set such that ΔSk and ΔLk are in opposite directions with the optical axis Lz therebetween, as in the input line image to which the reduction processing is applied in the embodiment. In other words, the x-th pixel Pix and the dot image Lkx are located opposite each other with the optical axis Lz therebetween. Other matters are handled in the same way as for matters related to the line image in the input image (e.g., the line image RL3) to which the positional information Inf indicating that the input image is farther away than the reference display position J is added. Consequently, the image object is enlarged in the horizontal direction H, as illustrated in the corresponding relation between the image object V4 in the "input image" row and the image object V4 in the "visual perception (user)" row in FIG. 17.

Figure 21:
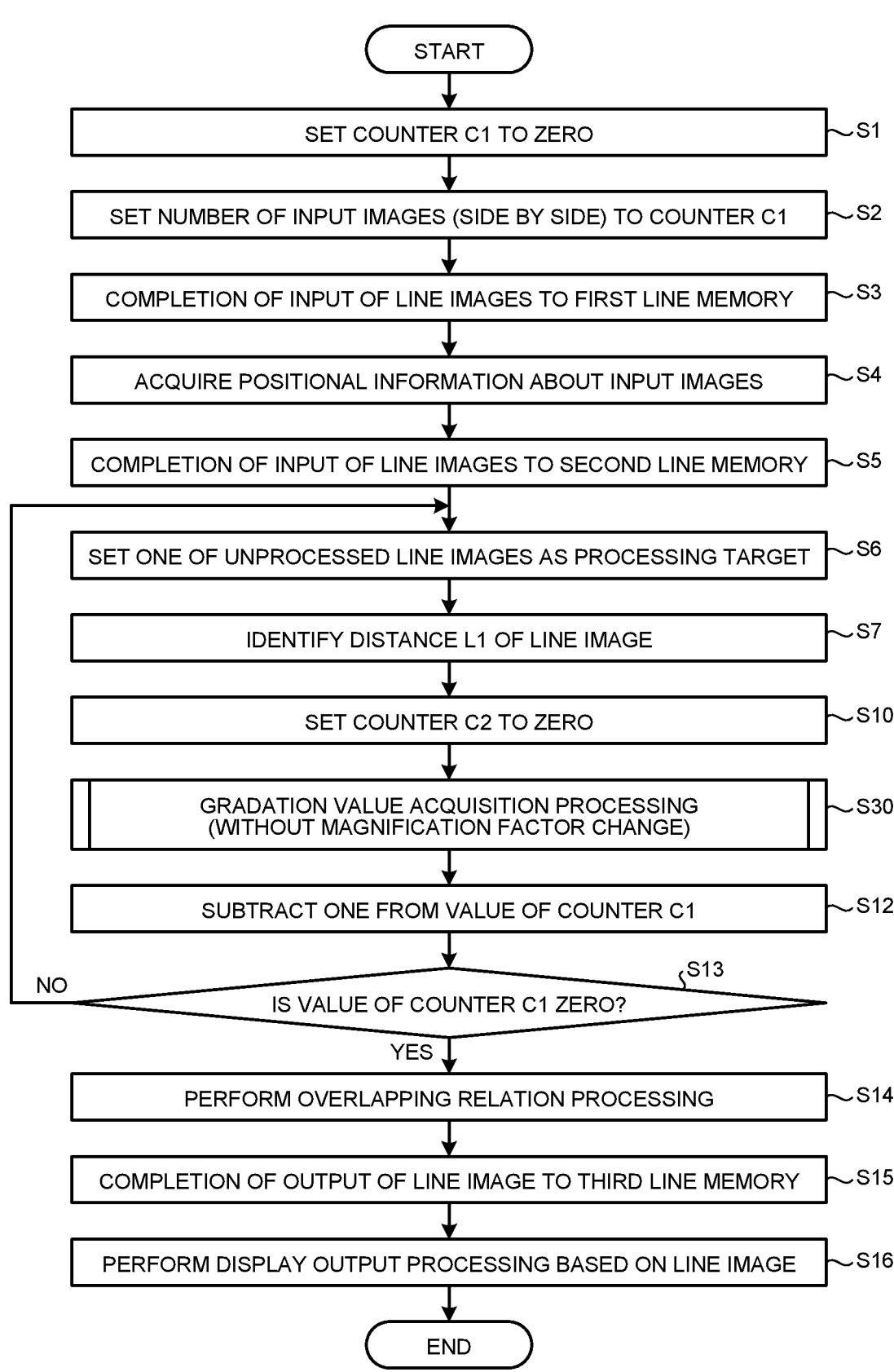
FIG. 21 is a flowchart illustrating an exemplary sequence of main processing by the image processing circuit in the modification.

FIG. 21 is a flowchart illustrating an exemplary sequence of main processing by the image processing circuit 100 in the modification. In the modification, the processing at step S8 and step S9 described in the sequence of main processing by the image processing circuit 100 in the embodiment (refer to FIG. 14) are omitted, and step S10 is performed after the processing at step S7. In the modification, gradation value acquisition processing (without magnification factor change) is performed (step S30) instead of the processing at step S11 in the embodiment. After the processing at step S30, the processing at step S12 is performed.

Figure 22:
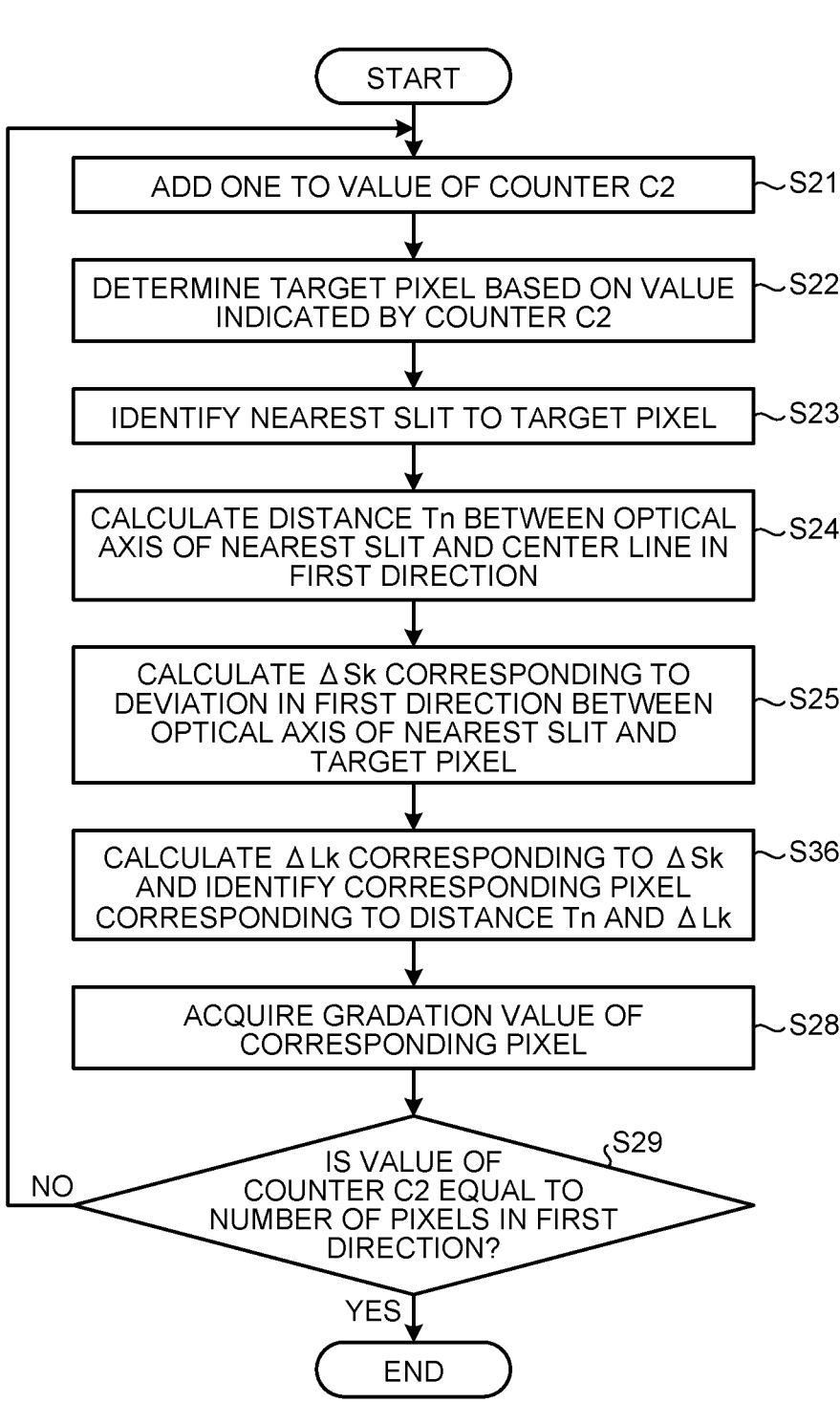
FIG. 22 is a flowchart illustrating an exemplary gradation value acquisition processing (without magnification factor change) illustrated in FIG. 21.

FIG. 22 is a flowchart illustrating an exemplary gradation value acquisition processing (without magnification factor change) illustrated in FIG. 21. In the modification, the processing at step S26 and step S27 described in the gradation value acquisition processing (with magnification factor change) in the embodiment (refer to FIG. 15) is not performed. In the modification, after the processing at step S25, the arithmetic circuit 121 calculates ΔLk corresponding to ΔSk calculated by the processing at step S25, and identifies the corresponding pixel of the pixel Pix that is set as a target pixel by the processing at step S22 based on the distance Tn calculated by the processing at step S24 and ΔLk (step S36). Specifically, as illustrated in the example in the "line image" row in FIG. 20, the arithmetic circuit 121 identifies, as the corresponding pixel, the dot image Lkx located by a distance of (Tn+ΔLk) from the center line CL in the line image set as the processing target by the processing at step S6. In the processing at step S28 in the modification, the arithmetic circuit 121 acquires the gradation value of the dot image (e.g., dot image Lkx) identified as the corresponding pixel at step S36.

Except for the matters noted above with reference to FIGS. 21 and 22, the sequence of main processing by the image processing circuit 100 in the modification is the same as the sequence of the main processing by the image processing circuit 100 in the embodiment described with reference to FIGS. 14 and 15. Except for the items noted with reference to FIGS. 17 to 22, each configuration in the modification is the same as each configuration in the embodiment.

According to the modification, the image processing circuit (e.g., the image processing circuit 100) reduces one (e.g., the input image IA3) of the first image (e.g., the input image IA3) and the second image (e.g., the input image IA4), to which the positional information indicating that the one is located farther than the virtual projection position (the reference display position J) of the third image is added, and composites the reduced image into the third image (e.g., the output image OA). The image processing circuit (e.g., the image processing circuit 100) enlarges the other (e.g., the input image IA4) of the first image and the second image, to which the positional information indicating that the other is located closer than the virtual projection position of the third image is added, and composites the enlarged image into the third image. This allows for more faithful reproduction of the perspective created by the position in the depth direction D indicated by the positional information Inf.

When a parallax image is generated using the parallax generator 8 in the same manner as the first embodiment illustrated in FIG. 5, the position of the parallax generator 8 is not limited to the opposite side to the light source device 6 with the display panel 2 therebetween.

Figure 23:
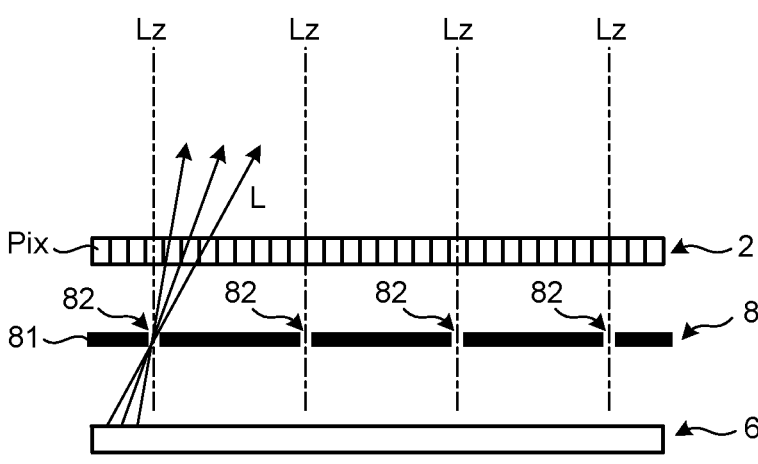
FIG. 23 is a schematic diagram illustrating another modification of the first embodiment in FIG. 6.
Figure 23:
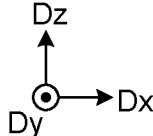

FIG. 23 is a schematic diagram illustrating another modification of the first embodiment in FIG. 6. As illustrated in FIG. 23, the parallax generator 8 may be interposed between the display panel 2 and the light source device 6. In this case, the parallax generator 8 generates a parallax image in the same manner as the first embodiment illustrated in FIG. 5 by causing part of the light L emitted from the light source device 6 to the display panel 2 to pass through the slits 82. FIG. 23 illustrates a configuration of the head-up display device in the modification. In the head-up display device, the light L from the display panel 2 is projected onto the projection destination part (e.g., the front windshield FG). The parallax generator 8 is disposed on the opposite side to the projection destination part with respect to the display panel 2. The positional information (the positional information Inf) is added to each of the first image (e.g., the input image IA1) and the second image (e.g., the input image IA2), and the positional information (the positional information Inf) indicates a virtual position of the image in the depth direction (depth direction D). The image processing circuit (e.g., the image processing circuit 100) composites the first image and the second image based on the positional information to generate the third image (e.g., the output image OA) and causes the display panel 2 to display the third image. The display panel 2 is a liquid crystal panel, and the parallax generator 8 is disposed between the liquid crystal panel and the light source device 6, which emits light from the opposite side to the projection destination part with respect to the liquid crystal panel.

Second Embodiment

Figure 24:
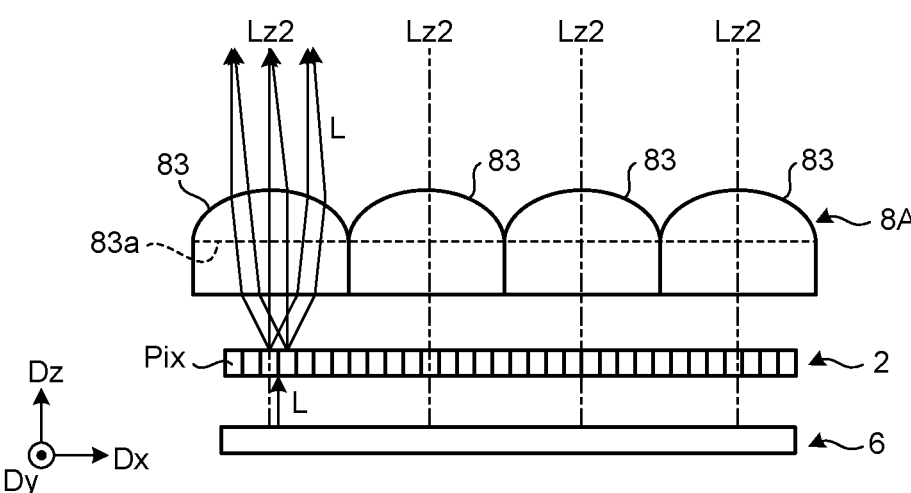
FIG. 24 is a schematic diagram illustrating a second embodiment forming the light field panel having a different structure from that of the first embodiment illustrated in FIG. 6.

FIG. 24 is a schematic diagram illustrating a second embodiment forming a light field panel having a different structure from that of the first embodiment illustrated in FIG. 5. As illustrated in FIG. 24, the light field panel may use the parallax generator 8A to change the angle of light that is transmitted through each pixel Pix of the display panel 2 and travels toward the plate mirror M1 (refer to FIG. 1), thereby limiting the angle in the first direction Dx-third direction Dz plane of the light reaching the user Hu. The parallax generator 8A is a member having a light-transmitting property. In the parallax generator 8A, the incident side of light from the display panel 2 has a planar shape along the first direction Dx-second direction Dy plane. The parallax generator 8A has a plurality of curved portions 83 on the outgoing surface side of the light from the display panel 2 thereof. Each of the curved portions 83 has a convex lens shape that rises in an arc shape on the outgoing surface side with respect to the line along the first direction Dx indicated by the dashed line 83*a* in FIG. 24. The dashed line 83*a* is parallel to the plane on the incident surface side of the parallax generator 8A. The design matters for the positions and shapes of the curved portions 83 are determined based on prior measurements and other factors such that the parallax image with reference to the position of the reference display position J is perceived by the user Hu.

When the parallax generator 8A is employed in place of the parallax generator 8, the same processing as in the first embodiment can be applied to the second embodiment by assuming the position of the center optical axis Lz2 of the convex lens of the curved portion 83 illustrated in FIG. 24 as the optical axis Lz.

Figure 25:
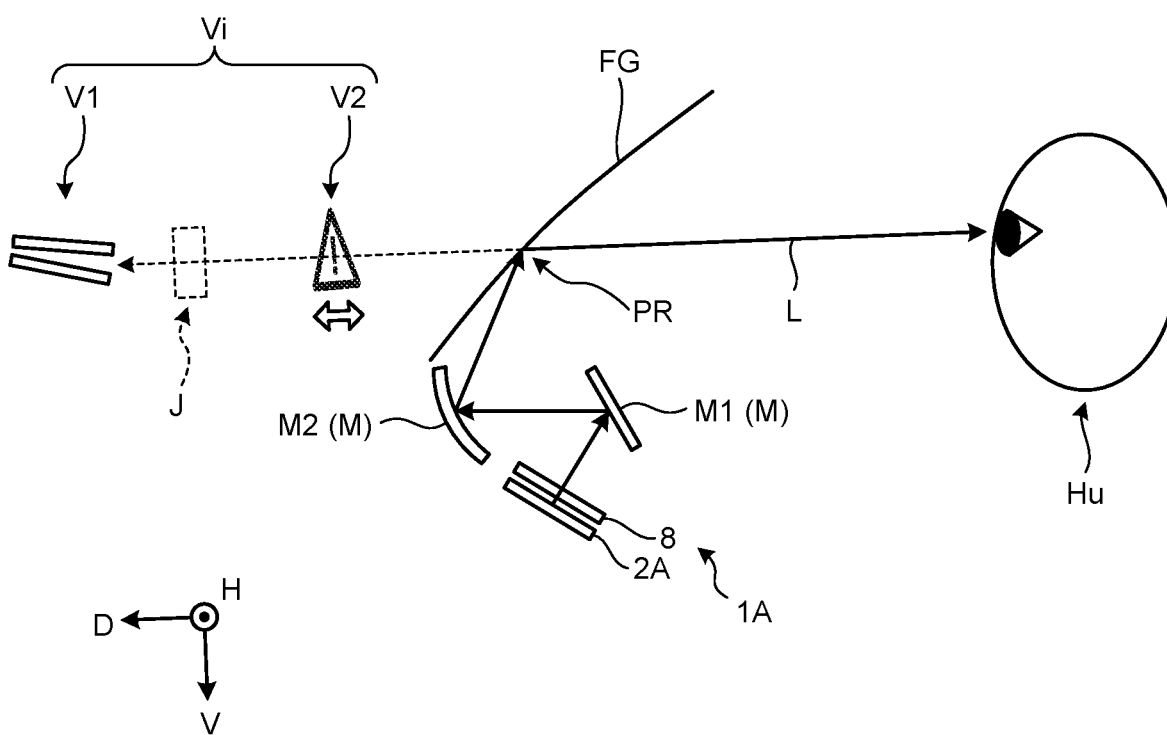
FIG. 25 is a schematic diagram illustrating the main configuration of a display device that employs a self-light emission display panel.

FIG. 25 is a schematic diagram illustrating the main configuration of a display device 1A, in which a self-light emission display panel is employed. In the embodiments and the modifications (embodiments, etc.) described above, images are projected onto the projection position PR of the front windshield FG by the combination of the display panel 2 and the light source device 6. The configuration for projecting images is not limited to this. For example, as illustrated in FIG. 25, instead of the combination of the display panel 2 and the light source device 6, a self-light emission display panel 2A, such as an organic light emitting diode (OLED) panel or an inorganic EL display using an inorganic light emitting diode (micro LED), may be used to project images. As a specific configuration for causing the self-light emission display panel 2A to function as the light field panel, the first embodiment illustrated in FIG. 5 or the second embodiment illustrated in FIG. 24 can be employed.

The position in the depth direction D indicated by each of the positional information Inf11, Inf12, Inf13, Inf21, Inf22, and Inf23 is only an example and is not limited to this, and any value can be set.

Other action effects provided by the modes described in the above-mentioned embodiments, etc. that are obvious from description of the present specification or at which those skilled in the art can appropriately arrive should naturally be interpreted to be provided by the invention.

What is claimed is:

1. A head-up display device, comprising:
a display panel configured to display a third image that is a composite of first image perceived by a user as being located on a far side in a depth direction and second image perceived by the user as being located on a near side in the depth direction;
a parallax generator configured to generate parallax of the first image and parallax of the second image; and
a projection destination part onto which projection light emitted from a display surface side of the display panel and modulated by the parallax generator is projected, wherein
positional information is added to each of the first and second images, the positional information indicating a virtual position in the depth direction of the image.

2. The head-up display device according to claim 1, wherein
light from the display panel is projected onto the projection destination part,
the parallax generator is disposed on a projection destination side of the display panel, and
the head-up display device further includes an image processing circuit configured to composite the first and the second image based on the positional information to generate the third image and configured to cause the display panel to display the third image.

3. The head-up display device according to claim 2, wherein the display panel is a liquid crystal panel or a self-light emission display panel.

4. A head-up display device comprising:
a display panel configured to display a third image that is a composite of first and second images;
a parallax generator configured to generate parallax of the first image and parallax of the second image; and
a projection destination part onto which projection light emitted from a display surface side of the display panel and modulated by the parallax generator is projected, wherein
light from the display panel is projected onto the projection destination part,
the parallax generator is disposed on a side opposite the projection destination part with respect to the display panel,
positional information is added to each of the first and the second images, the positional information indicating a virtual position in a depth direction of the image, and
the head-up display device further includes an image processing circuit configured to composite the first and the second image based on the positional information to generate the third image and configured to cause the display panel to display the third image.

5. The head-up display device according to claim 4, wherein
the display panel is a liquid crystal panel, and
the parallax generator is disposed between the liquid crystal panel and a light source device that emits light from the side opposite the projection destination part with respect to the liquid crystal panel.

6. A head-up display device comprising:
a display panel configured to display a third image that is a composite of first and second images;
a parallax generator configured to generate parallax of the first image and parallax of the second image; and
a projection destination part onto which projection light emitted from a display surface side of the display panel and modulated by the parallax generator is projected, wherein
light from the display panel is projected onto the projection destination part,
the parallax generator is disposed on a side opposite the projection destination part with respect to the display panel,
positional information is added to each of the first and the second images, the positional information indicating a virtual position in a depth direction of the image,
the head-up display device further includes an image processing circuit configured to composite the first and the second image based on the positional information to generate the third image and configured to cause the display panel to display the third image,
the positional information includes information indicating a positional relation between two different points in one of two directions orthogonal to the depth direction, the two directions being a vertical direction and a horizontal direction, and
the image processing circuit configured to generate the third image in which the positional relation between the two points is reflected.

7. The head-up display device according to claim 4, wherein
the positional information includes information indicating a positional relation between two different points in one of two directions orthogonal to the depth direction, the two directions being a vertical direction and a horizontal direction, and the image processing circuit configured to generate the third image in which the positional relation between the two points is reflected.

8. The head-up display device according to claim 6, wherein the positional information further includes information about one point that indicates a different positional relation with respect to the two points in the other of the vertical and the horizontal directions, and the image processing circuit generates the third image in which the positional relation between the two points and the one point is reflected.

9. The head-up display device according to claim 7, wherein the positional information further includes information about one point that indicates a different positional relation with respect to the two points in the other of the vertical and the horizontal directions, and the image processing circuit generates the third image in which the positional relation between the two points and the one point is reflected.

10. A head-up display device comprising:

a display panel configured to display a third image that is a composite of first and second images;

a parallax generator configured to generate parallax of the first image and parallax of the second image; and a projection destination part onto which projection light emitted from a display surface side of the display panel and modulated by the parallax generator is projected, wherein light from the display panel is projected onto the projection destination part, the parallax generator is disposed on a side opposite the projection destination part with respect to the display panel, positional information is added to each of the first and the second images, the positional information indicating a virtual position in a depth direction of the image, the head-up display device further includes an image processing circuit configured to composite the first and the second image based on the positional information to generate the third image and configured to cause the display panel to display the third image, the image processing circuit reduces one of the first image and the second image, to which the positional information indicating that the one is located farther than a virtual projection position of the third image is added, and generates the third image by composition, and the image processing circuit enlarges another of the first image and the second image, to which the positional information indicating that the other is located closer than the virtual projection position of the third image is added, and generates the third image by composition.

11. The head-up display device according to claim 4, wherein the image processing circuit reduces one of the first image and the second image, to which the positional information indicating that the one is located farther than a virtual projection position of the third image is added, and generates the third image by composition, and the image processing circuit enlarges another of the first image and the second image, to which the positional information indicating that the other is located closer than the virtual projection position of the third image is added, and generates the third image by composition.

12. The head-up display device according to claim 2, wherein the image processing circuit performs transparency processing or hiding processing on an area where the first image and the second image overlap.

13. The head-up display device according to claim 4, wherein the image processing circuit performs transparency processing or hiding processing on an area where the first image and the second image overlap.

14. The head-up display device according to claim 2, wherein the first image and the second image are input to the image processing circuit on a line-image-by-line-image basis, and the image processing circuit generates the third image on a line-image-by-line-image basis.

15. The head-up display device according to claim 4, wherein the first image and the second image are input to the image processing circuit on a line-image-by-line-image basis, and the image processing circuit generates the third image on a line-image-by-line-image basis.

16. The head-up display device according to claim 14, wherein the display panel has a line memory.

17. The head-up display device according to claim 15, wherein the display panel has a line memory.

* * * * *